United States Patent [19]

Shaunnessey

[11] 4,130,298

[45] Dec. 19, 1978

[54] OCCUPANT RESTRAINT AND PROTECTION SYSTEM FOR AN AUTOMOTIVE VEHICLE

[76] Inventor: Jerome Shaunnessey, 18 E. Willow Rd., Wheeling, Ill. 60090

[21] Appl. No.: 648,382

[22] Filed: Jan. 12, 1976

[51] Int. Cl.² .......................................... B60R 21/08
[52] U.S. Cl. .................................. 280/730; 280/729; 280/733; 280/734; 280/738; 280/739; 280/742; 285/238
[58] Field of Search .............. 280/728, 731, 732, 730, 280/733, 736, 741, 742, 743, 748, 749, 751, 753

[56] References Cited

U.S. PATENT DOCUMENTS

| 2,025,822 | 12/1935 | Pryor | 280/749 |
|---|---|---|---|
| 2,806,737 | 9/1957 | Maxwell | 280/730 X |
| 2,842,372 | 7/1958 | D'Antini | 280/95 R |
| 3,133,746 | 5/1964 | Zazzara | 280/753 |
| 3,494,633 | 2/1970 | Malloy | 280/749 |
| 3,495,675 | 2/1970 | Hass | 280/735 |
| 3,623,768 | 11/1971 | Capener | 280/730 X |
| 3,630,542 | 12/1971 | Wycech | 280/753 |
| 3,642,303 | 2/1972 | Irish | 280/730 |
| 3,663,037 | 5/1972 | Wohn-Machowski | 280/749 |
| 3,664,682 | 5/1972 | Wycech | 280/730 |
| 3,692,327 | 9/1972 | Barrick | 280/749 |
| 3,695,629 | 10/1972 | Schlanger | 280/730 |
| 3,715,130 | 2/1973 | Harada | 280/751 X |
| 3,722,528 | 3/1973 | Fiala | 280/736 X |
| 3,733,088 | 5/1973 | Stephenson | 280/730 |
| 3,753,576 | 8/1973 | Gorman | 280/730 |
| 3,774,936 | 11/1973 | Barnett | 280/730 |
| 3,782,756 | 1/1974 | Brown | 280/749 |
| 3,788,666 | 1/1974 | Kramer | 280/739 |
| 3,822,896 | 7/1974 | Hallberg | 280/733 |
| 3,837,422 | 9/1974 | Schlanger | 280/749 X |
| 3,837,670 | 9/1974 | Hilyard | 280/753 |
| 3,897,961 | 8/1975 | Leising | 280/730 |
| 3,909,039 | 9/1975 | Barenyi | 280/749 |

Primary Examiner—John P. Silverstrim
Attorney, Agent, or Firm—Merriam, Marshall & Bicknell

[57] ABSTRACT

A system for restraining and protecting the driver and passengers on the front seat of an automotive vehicle against injury as a result of a collision with another vehicle or object, wherein an expansible bag is stored in a folded, inoperative position in a compartment on the underside of the roof of the vehicle and generally overlying the laps of the driver and passengers. A pair of elongated arms are pivotally mounted in the vehicle for movement between an upwardly inclined, inoperative position adjacent the windshield posts of the vehicle to a downwardly inclined, operative position adjacent the inner sides of the side doors of the vehicle. The distal ends of the arms are connected to the expansible bag and serve to rapidly withdraw and unfold the same from the storage compartment when the system is triggered. After the bag is unfolded and deployed, fluid under pressure is supplied to a pair of laterally spaced compartments in the bag through passages in the arms. A central compartment of the bag inflates with air at atmospheric pressure as a result of inflation of the laterally spaced compartments.

A lost motion connection between the piston and plunger rod of each piston and cylinder assembly permits the rod to extend an additional incremental amount, whenever the bag is subjected to the forward force of the bodies of the driver and passengers, so that a vent valve in each assembly is shifted to a position causing a respective one of the pressurized compartments of the bag to be vented to the atmosphere and deflate at a controlled rate.

30 Claims, 17 Drawing Figures

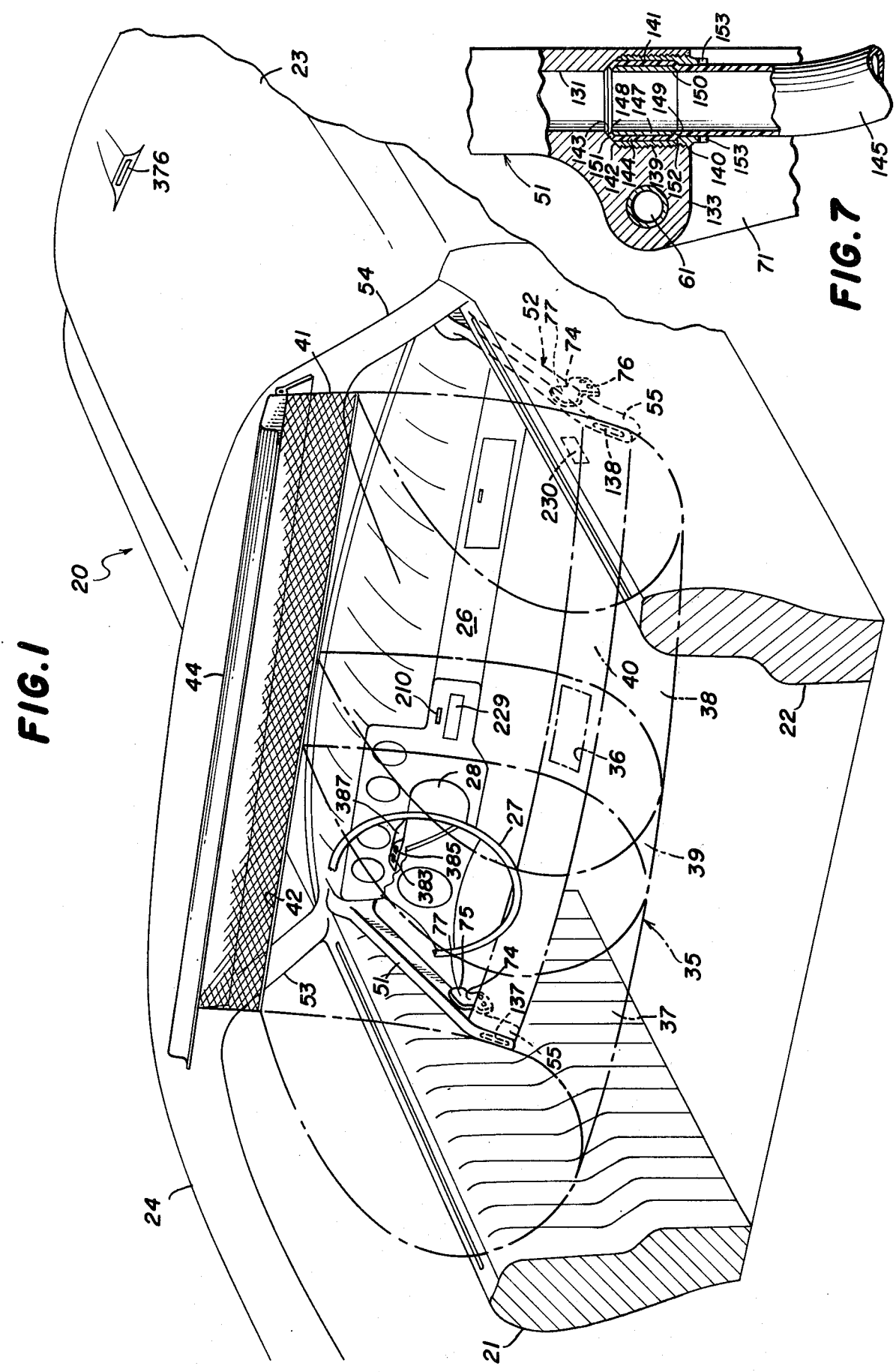

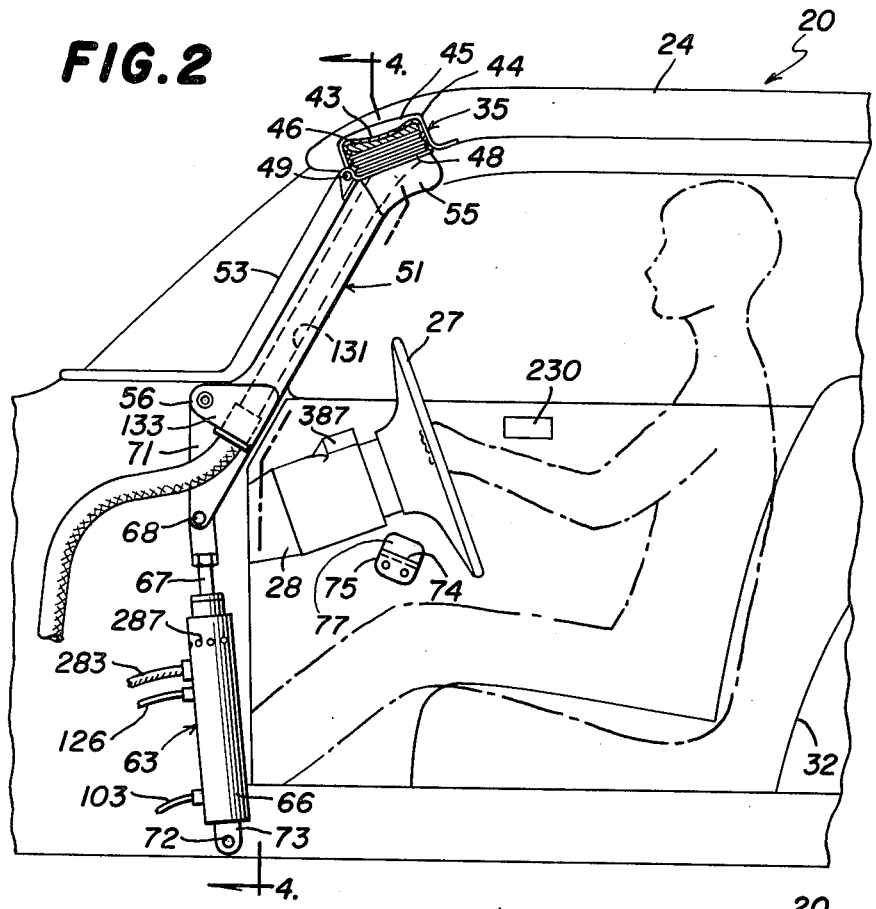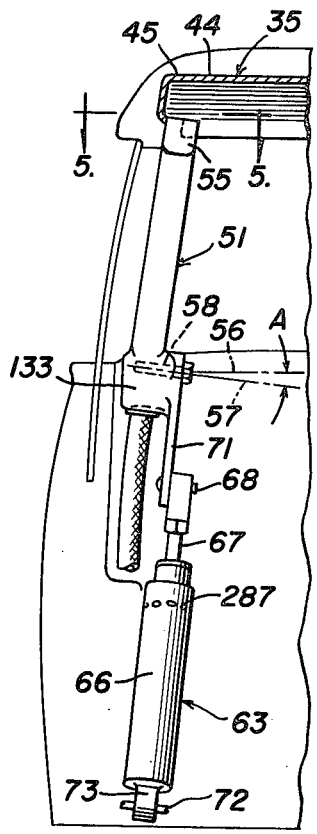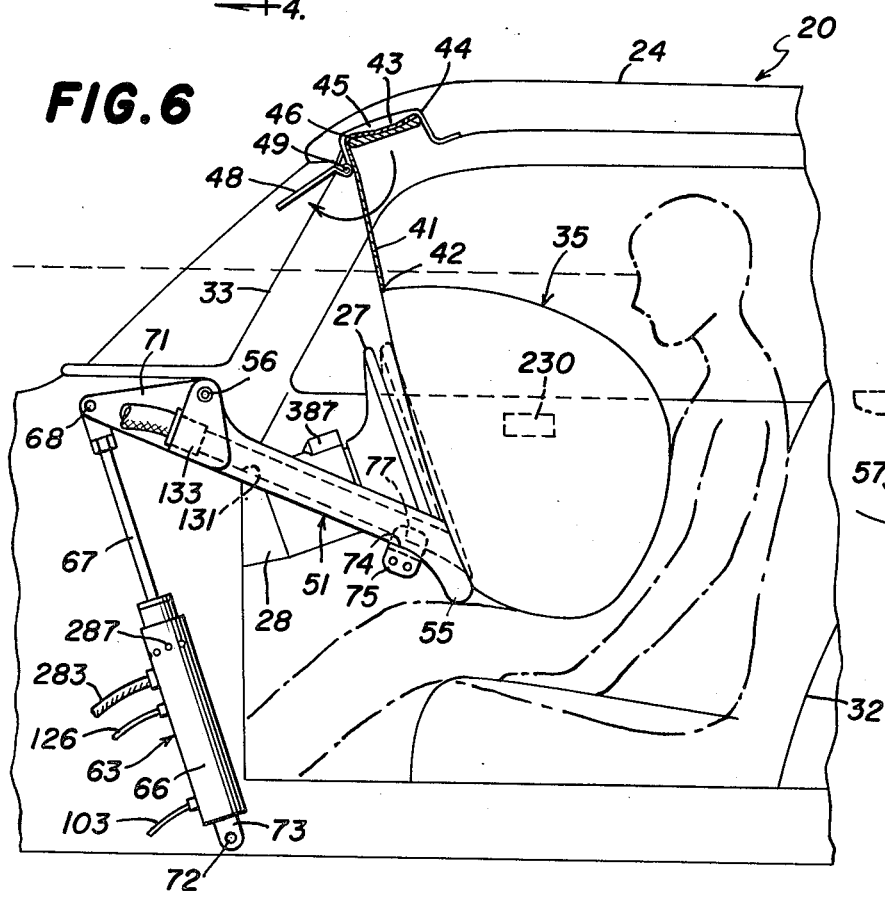

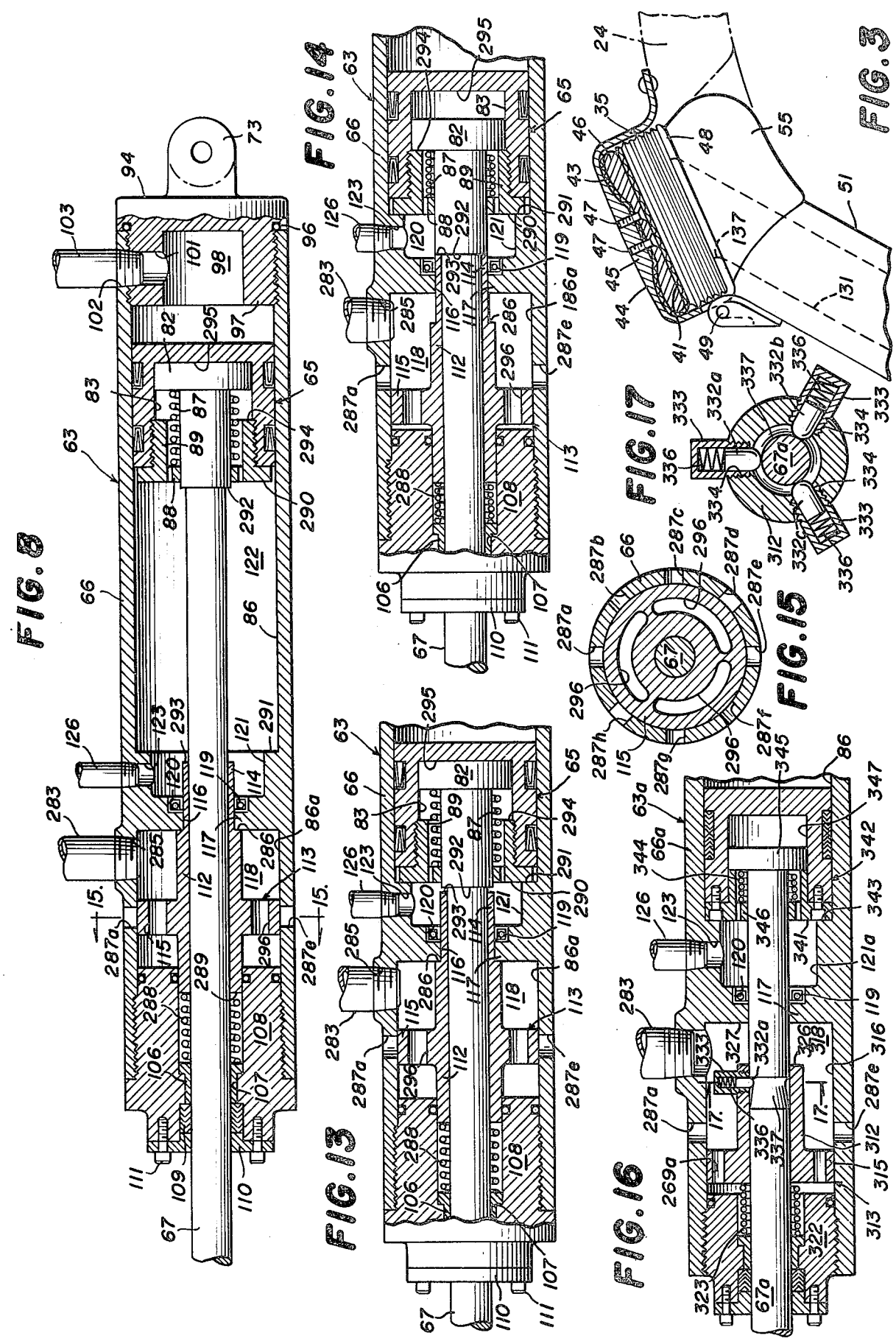

OCCUPANT RESTRAINT AND PROTECTION SYSTEM FOR AN AUTOMOTIVE VEHICLE

This invention relates to a restraint and protection system for the occupants of an automotive vehicle, and more particularly relates to a system employing a rapidly inflatable cushion for protecting the driver and passengers on the front seat of an automotive vehicle against injury as a result of a collision of the vehicle with another vehicle or object.

Various devices and systems have been heretofore advanced to protect the driver and passengers of an automotive vehicle against injury as a result of a collision of the vehicle with another vehicle or object. Examples of some early devices developed for this purpose and which employ netting for surrounding and restraining forward movement of the passengers of the vehicle prior to and during a collision are disclosed in the U.S. Pat. Nos. to Pryor 2,025,822, Barrick et al 3,629,327 and John 3,795,412. Such systems were objectionable because of the likelihood of injury to the face and neck of the occupants of the vehicle as a result of the high relative speed of contact with the netting.

In more recent years, automative vehicle passenger restraint and protection devices have been developed which utilize one or more inflatable bags to provide a resilient cushion between the driver and passengers of the vehicle and the internal structure thereof so that the possibility of injury to the driver and passengers is reduced in the event of a collision. Some examples of devices of this character are disclosed in the U.S. Pat. Nos. to Kemmerer et al 3,552,769, Irish et al 3,642,303, Graebe 3,747,952, Kramer et al No. 3,788,666 and Ventre et al 3,795,414. While the restraint and protection devices disclosed in these patents were an improvement over the devices employing netting or solid barriers to prevent forward movement of the driver and passengers of the vehicle in the event of a collision, the mounting of the bags of many of these devices was such that the bags could be deflected to one side of the other of the vehicle by the forwardly moving bodies of the driver and passengers. Consequently, the protection offered by such devices was somewhat uncertain, particularly in collisions other than head-on.

The manner in which the driver and passenger protecting structures of the devices heretofore developed are moved into their operative positions has also undergone some development. Thus, in the U.S. Barrick et al Pat. No. 3,692,327, for example, movement of a safety curtain of elastic fabric or mesh from an inoperative horizontal position above the driver and passengers of the vehicle to an operative, downwardly depending position embracing the head and upper torso of the driver and passengers is effected by forward and downward swinging movement of a U-shaped frame to which the safety curtain is attached. In the U.S. Brown Pat. No. 3,782,756, a pair of elongated arms are pivotally mounted in the passenger compartment of the vehicle and are movable between an upwardly extending, generally vertical position and a rearwardly extending, generally horizontal position as a result of the inertia force developed by large counterweights on the lower ends of the arms. The rearward and downward swinging movement of the arms serves to pull a protective, resilient material shield downwardly and rearwardly from a stored position above the driver to an operative position across the face and upper torso of the driver.

Since the vehicular safety system disclosed in the Brown patent depends upon the inertia force developed in the counterweights of the pivotal arms, such system is of questionable reliability and value in other than head-on collisions and is likely to present a safety hazard to the occupants of the vehicle.

Different types of triggering arrangements have also been utilized in the automotive vehicle passenger protection devices heretofore advanced. Thus, while the safety device disclosed in the U.S. Pryor Pat. No. 2,025,822 was actuated by the driver's foot, the U.S. Hass et al Pat. No. 3,495,675 discloses a vehicle safety apparatus wherein either a brake pedal operated switch or a manually operated switch can be utilized to trigger the operation of the apparatus. Triggering devices responsive to movement of the front bumper of an automotive vehicle have also been employed to trigger the operation of a passenger restraint and protection system installed in the vehicle. Some examples of triggering arrangements of the latter type are disclosed in the U.S. Pat. Nos. to D'Antini 2,842,372, Gillund et al 3,703,300, Jones 3,718,332, Hass et al 3,495,675 and DeLorean et al 3,815,703. However, the triggering arrangements disclosed in the aforementioned group of patents suffer from the common defect that they may not trigger the associated passenger protection system unless the vehicle contacts the bumper of another vehicle or object of substantially the same height as the bumper of the vehicle having this type of triggering arrangement and in a substantially head-on collision.

Accordingly, it is a general object of the present invention to provide a novel and improved restraint and protection system for protecting the driver and passengers of an automotive vehicle, which is not subject to the aforementioned disadvantages and shortcomings of the prior art.

Another object is to provide a novel restraint and protection system for protecting the driver and passengers of an automative vehicle, wherein an inflatable bag is utilized to forcefully engage the lap and pelvic area of the driver and passengers on the front seat of the vehicle so that the occupants are held in their seats and restrained against forward movement in the event of a collision.

A further object is to provide a novel restraint and protection system of the foregoing character, wherein a pair of laterally spaced arms are pivotally mounted in the vehicle and utilized to effect rapid deployment of the inflatable bag of the system.

Still another object is to provide a novel restraint and protection system of the foregoing character, wherein the path of movement of the inflatable bag of the system is such as to minimize the possibility of injury to the driver and passengers of the vehicle as the bag is being deployed and inflated.

A still further object is to provide a novel restraint and protection system of the foregoing character, wherein the inflatable bag of the system includes a plurality of compartments and wherein at least one of the swingable arms of the system serves as a conduit for conducting fluid under pressure to at least one of the compartments of the bag while at least one of the other compartments of the bag fills with air at atmospheric pressure as the bag expands.

Another object is to provide a novel restraint and protection system of the foregoing character, wherein the inflatable bag of the system begins to deflate at a controlled rate after the bag is fully inflated and the bodies of the driver and passengers are pressing forward on the bag in order to reduce the possibility of the driver and passengers rebounding from the bag after a collision.

A further object is to provide a novel restraint and protection system of the foregoing character, which will protect the driver and passengers of the vehicle against injury in multiple collision accidents and in case the vehicle rolls over.

A more particular object is to provide a novel restraint and protection system of the character described, which is actuated by a forward movement of the steering wheel of the vehicle.

A further object is to provide a novel restraint and protection system of the character described, which permits the driver of the vehicle to gain confidence in the protective capabilities of the system and the time interval involved for the system to become fully operative without actually actuating the system.

Still another object is to provide a novel restraint and protection system for the driver and passengers of an automotive vehicle, wherein the containers used to store fluid under pressure for deploying and inflating the driver and passenger protecting bag of the system are stored outside the passenger compartment of the vehicle so that the possibility of injury to the driver and passengers from rupturing of the containers is minimized.

A still further object is to provide a novel occupant restraint and protection system of the character described, wherein the components of the system occupy a minimum of space in the vehicle so that all of the usual accessories can be mounted on the dashboard of the vehicle.

Another particular object is to provide a novel and improved restraint and protection system for the driver and passengers of an automotive vehicle which is simple in construction, has a high degree of reliability, and is economical to manufacture.

These and other objects will become apparent from the following detailed description and accompanying sheets of drawings, in which:

FIG. 1 is a fragmentary perspective view of the forward portion of the passenger compartment of an automotive vehicle having a restraint and protection system installed therein and showing the passenger protecting bag of the system in phantom lines as it would appear when fully deployed and inflated;

FIG. 2 is a fragmentary side elevational view showing the approximate location and positions of some of the components of the restraint and protection system of the present invention when the latter is installed in an associated automotive vehicle and inoperative;

FIG. 3 is a fragmentary, side elevational view, of the upper end of one of the swingable arms of the restraint and protection system of the present invention and showing additional details of the manner in which the bag is stored in a folded, inoperative position in its storage compartment in the roof of the vehicle;

FIG. 4 is a fragmentary elevational view taken substantially along the line 4—4 of FIG. 2;

FIG. 5 is a fragmentary plan view of one of the swingable arms which deploy the inflatable bag of the system and showing the inclination of the pivot pin of the arm in a horizontal plane;

FIG. 6 is a view similar to FIG. 2 but showing the position of the parts of the system after the system has been actuated and the inflatable bag of the system has engaged the driver of the vehicle;

FIG. 7 is a fragmentary sectional view, with portions thereof in elevation, showing the connection of one end of a flexible hose with the pivot end of one of the swingable arms of the restraint and protection system of the present invention;

FIG. 8 is a longitudinal sectional view, with some parts in elevation, of one of the cylinder assemblies utilized to effect movement of one of the swingable arms of the restraint and protection system of the present invention;

FIGS. 13 and 14 are fragmentary longitudinal sectional views of a portion of the cylinder assembly illustrated in FIG. 8 and showing the internal parts of the assembly in the positions they occupy during different stages of operation of the system;

FIG. 15 is a transverse sectional view taken along the line 15—15 of FIG. 8;

FIG. 16 is a fragmentary longitudinal sectional view of a portion of another piston and cylinder assembly embodying the features of the present invention; and FIG. 17 is an enlarged transverse sectional view taken along the line 17—17 of FIG. 16.

Figure 9:
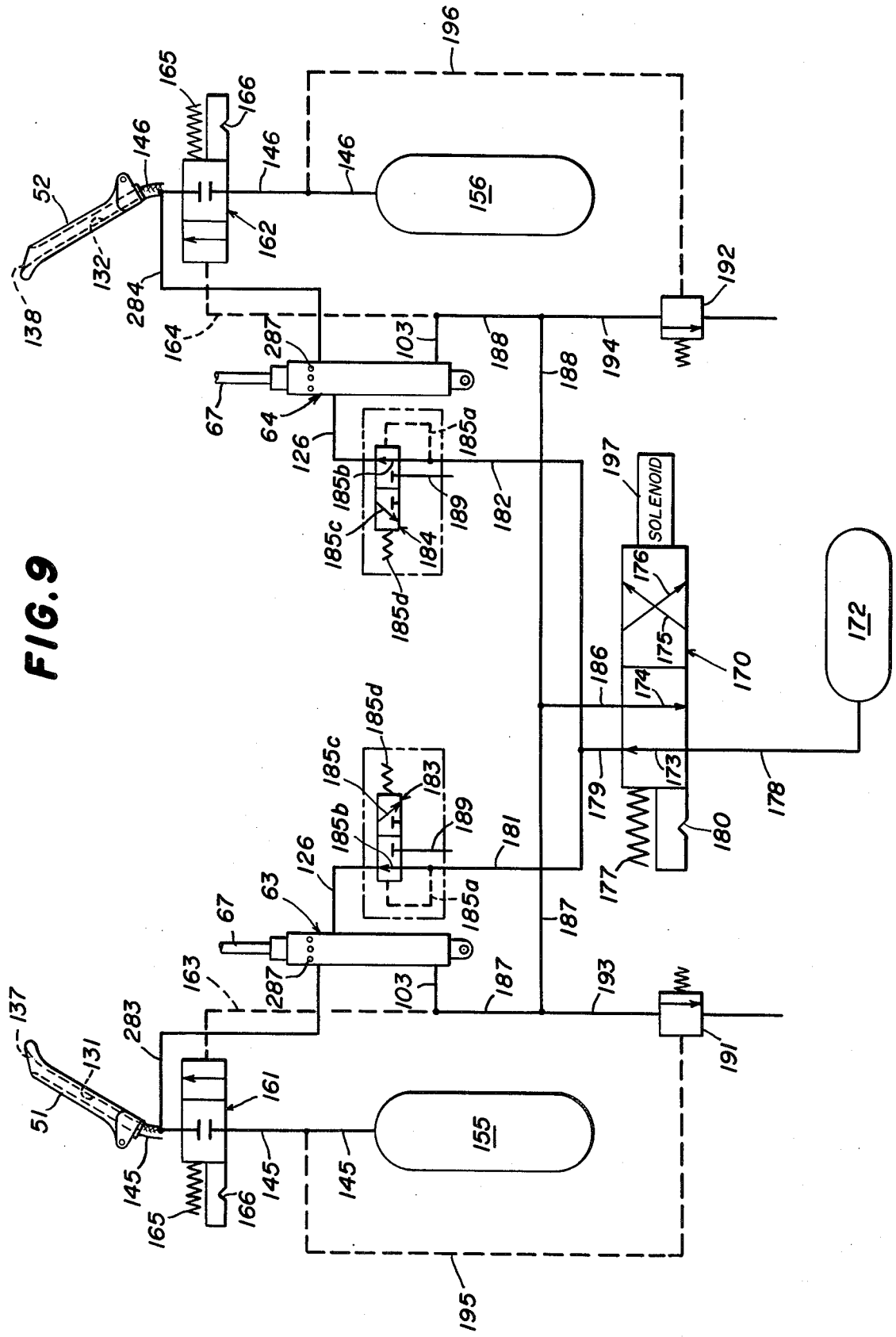
FIG. 9 is a diagram of the fluid circuit of the restraint and protection system of the present invention.

Briefly described, the present invention contemplates a novel and improved restraint and protection system for protecting the driver and passengers on the front seat of an automotive vehicle or the like in the event of a collision with another vehicle or object. The system, to be hereinafter described in detail, includes expansible cushioning means that is adapted to be stored in a collapsed, folded condition in a storage compartment on the underside of the roof of the vehicle so as to generally overlie the knees of the driver and front seat passengers. The expansible cushioning means includes a plurality of compartments at least one of which is adapted to be connected to a source of fluid under pressure and the other of which is adapted to fill with air at atmospheric pressure as the cushioning means expands to an operative position engaging the lap and pelvic areas of the driver and passengers on the front seat of the vehicle.

Actuating means for effecting rapid deployment and expansion of the cushioning means is incorporated into the vehicle in which the system is installed and includes at least one and preferably a pair of elongated, laterally spaced, movable members, each of which is mounted for pivotal movement between an inoperative position remote from the driver and passengers and an operative position adjacent to the side doors of the vehicle and in laterally spaced relation from the laps and generally adjacent to the knees of the driver and passengers. One end of each elongated movable member is connected to the cushioning means so that pivotal movement of these members effects unfolding of the cushioning means when the system is actuated. Pivotal movement of the movable members to their operative position is effected by fluid pressure actuated means, which includes a pair of piston and cylinder assemblies having extensible rods connected to the movable members.

Means is provided for applying motive fluid under pressure to the fluid pressure actuated means to cause the aforementioned movement of the movable members. Such means, in the embodiment to be hereinafter described in detail, comprises solenoid-actuated for controlling valve means controls the flow of fluid under pressure from a reservoir thereof to the piston and cylinder assemblies of the fluid pressure actuated means and cushioning fluid valve means is provided in conduit means respectively connecting the inflatable compartments of the cushioning means with another pair of reservoirs of fluid under pressure. Another conduit means bleeds fluid from the pressurized compartments of the cushioning means at a controlled rate when a vent valve member in each cylinder assembly shifts to a position venting the other conduit means to the atmosphere in response to movement of the cylinder rods to their fully extended positions.

Energization of the solenoid of the control valve means is controlled by a trigger switch in an electrical circuit of the system, the switch being responsive to movement of the steering wheel of the vehicle from its normal position to a position forwardly thereof. A vehicle speed responsive switch and an inertia switch in the electrical circuit prevent energization of the solenoid of the control valve means if the speed of the vehicle is less then a predetermined speed or if the vehicle has been decelerated or accelerated beyond a predetermined limit prior to the time that the trigger switch is closed by forward movement of the steering wheel.

A two-position mode selector switch is also provided in the electrical circuit of the system, the latter switch permitting the system to be operated either in a normal manner or in a practice mode. Thus, when the selector switch is positioned to operate the system in a normal manner, the system is actuated and the cushioning means is deployed and inflated whenever the trigger switch in the steering column of the vehicle is closed by forward movement of the steering wheel. Locking means and detent means in the steering column of the vehicle respectively prevent turning and rearward movement of the steering wheel after the latter is moved forwardly to actuate the system and the selector switch is positioned to operate the system in a normal manner.

When the selector switch is in its practice mode position, a solenoid connected to the detent means in the steering column is energized so that the detent means is held in a retracted position and prevented from holding the steering wheel in its forward position. The locking means is not rendered inoperable at this time, however, so that the steering wheel becomes locked against rotation as long as it is held in its forward position by the driver against the force of a spring, which tends to shift the wheel rearwardly to its normal operating position. In addition, the electrical circuit also includes signalling means providing signals to the driver of the vehicle indicative of the position of the detent in the steering column, and another signal symbolizing complete deployment and inflation of the cushioning means, the latter signal occurring after a predetermined time interval subsequent to closure of the trigger switch in the steering column by forward shifting of the steering wheel.

In FIG. 1, a portion of the interior of the automotive vehicle, in the present instance, a passenger automobile, is illustrated and indicated generally at 20. The vehicle 20 includes a body having left and right side doors, indicated at 21 and 22, respectively, a hood 23, and a roof 24 defining the passenger compartment of the vehicle. The vehicle 20 also includes a dashboard 26, and a steering wheel 27 is rotatably mounted in a steering column 28. For purposes of clarity of illustration and description of the various structural features of the present invention, the usual controls and front seat of the automotive vehicle 20 have been omitted.

Referring now to FIGS. 2-6, inclusive, in conjunction with FIG. 1, it will be seen that the vehicle 20 includes a restraint and protection system for preventing forward movement of the driver and any other passengers seated on the front seat, indicated at 32 in FIGS. 2 and 6, so that injury to the driver and passengers is prevented or substantially reduced in the event that the vehicle 20 is involved in a collision with another vehicle or object. The restraint and protection system comprises expansible cushioning means in the form of a bag, indicated generally at 35, which, when inflated, extends laterally across the passenger compartment of the automobile 20 between the doors 21 and 22 and somewhat rearwardly of the dashboard 26. When fully deployed and inflated, the bag 35 engages the lap, chest and pelvic areas of the driver and any other front seat passengers so as to firmly hold these occupants in their seats prior to, during and after a collision.

As best seen in FIG. 1, the bag 35 is of a unitary construction and includes at least one and preferably a plurality of compartments, there being two laterally spaced compartments 37 and 38 adjacent the left and right doors 21 and 22 of the vehicle, and a central compartment 39. The laterally spaced pair of compartments 37 and 38 are adapted to be filled with fluid under pressure from separate reservoirs mounted outside the passenger compartment in the vehicle 20, while the central compartment 39 is adapted to fill with air at atmospheric pressure as the bag 35 expands. To this end, the central compartment 39 is isolated from the compartments 37 and 38 and is provided with an orifice 36 (FIG. 1) through which air is drawn to inflate the compartment 39 as the compartments 37 and 38 expand. A laterally extending band of strengthening material 40 is secured to the compartments 37-39 to reinforce the central portion of the bag and limit forward deflection thereof when engaged by the bodies of the driver and passengers.

As best seen in FIGS. 1 and 6, the cross sectional shape of the bag 35 is that of a teardrop with the wider portion thereof disposed toward the lap and chest areas of the driver and passengers on the front seat of the vehicle. A laterally extending section of generally transparent, flexible material, indicated at 41, is secured to the upper marginal edge, indicated at 42, of the bag and the upper margin, indicated at 43 of the transparent section 41 is secured to the base of an elongated, inverted, generally U-shaped storage compartment 44 mounted in an elevated position in the passenger compartment of the automobile 20 so as to generally overlie the knees of the driver and any passengers on the front seat 32 of the vehicle. Specifically, the storage compartment 44 is preferably mounted in a recess in the underside of the roof 24 of the vehicle 20 so that the compartment 44 and bag 35 are substantially concealed from view when the bag is in a folded, compact, inoperative position. The upper margin 43 of the bag section 41 is secured to the base portion, indicated at 45, of the compartment 44 by a contoured plate member 46, which is held in clamping engagement with the margin 43 of the bag section 41 by a plurality of laterally spaced pairs of screws 47, one pair being shown in FIG. 3.

An elongated, plate-like door 48 is hingedly connected as at 49 to the forward wall of the compartment 44 so as to swing about an axis adjacent to the lower end of the front wall. The door 48 thus not only maintains the bag 35 in a folded condition in the compartment 44 when the system is inoperative, but also hides the bag from the view of the driver and passengers.

The expansible compartmented portions 37-39 of the bag 35 may be of any suitable material capable of being folded to a compact size and withstanding the stresses imposed thereon by the bodies of the driver and the passengers on the front seat 32 of the automobile during a collision. Rubberized or plasticized nylon are examples of some materials which might be used in the construction of the compartmented portions of the bag 35.

The laterally extending, transparent section 41 of the bag 35 may likewise be any suitable material having the desired strength and transparency characteristics. Open weave netting of nylon cord is an example of one type of material suitable for use in the construction of the transparent section 41 of the bag 35.

According to the present invention, the restraint and protection system includes actuating means for effecting rapid deployment or unfolding the bag 35 from its inoperative position illustrated in FIG. 2 to its operative position illustrated in FIGS. 1 and 6. Such actuating means comprises at least one and preferably a pair of laterally spaced, movable members or arms 51 and 52 mounted in laterally spaced relation in the passenger compartment of the vehicle for pivotal movement about generally horizontal axes extending laterally of the vehicle and located somewhat behind the dashboard 26. Specifically, the axes about which the arms 51 and 52 move are located in the vehicle 20 adjacent to the intersection of the lower ends of the left and right windshield posts, indicated at 53 and 54, with the dashboard 26 and the pivot axes of the arms 51 and 52 are inclined with respect to the horizontal, indicated by the broken line 56, which also extends laterally of the vehicle 20. Thus, in FIG. 4, it will be seen that the pivot axis, indicated at 57, of the left arm 51 is defined by a bolt 58, which is inclined downwardly from the horizontal line 56 by an angle A, and is inclined forwardly from the line 56 by an angle B (FIG. 5). Consequently, the distal ends, indicated at 55, of the arms 51 and 52 will swing through arcs which lie in laterally spaced planes inclined upwardly and inwardly and toward the front end of the vehicle 20.

Since the shape and positions of the doors, roof and windshield posts will vary in different vehicles, the magnitude of the angle A and B will likewise vary for different vehicles. However, the angles A and B will be chosen so that the arm 51 will swing from its inoperative position adjacent to the windshield post 53, as shown in FIG. 2, to a downwardlly and rearwardly inclined operative position illustrated in FIGS. 1 and 6. The pivot axis (not shown) of the arm 52 is likewise inclined downwardly and forwardly with respect to the horizontal line 56 at the same angles A and B as in the arm 51.

Swinging movement of the arms 51 and 52 between their operative and inoperative positions is effected by fluid pressure actuated means in the form of a pair of piston and cylinder assemblies 63 and 64 (FIGS. 2, 4, 6, 8 and 9), which may be mounted at the sides of the vehicle body immediately forwardly of the doors 21 and 22 thereof. Since the assemblies 63 and 64 are identical, only the assembly 63 will be described in detail.

Thus, the piston and the cylinder assembly 63 includes an elongated casing 66 having an extensible and rectractable plunger rod 67 mounted therein. One end of the rod 67 is pivotally connected as by a pin 68 to the other end of a plate-like crank portion 71 on the arm 51. The inner end of the rod 67 is connected to a piston 65 (FIG. 8) that is shiftably mounted in the casing 66. The lower end of the casing 66 is pivotally secured to the frame or other structural member of the body of the vehicle 20 as by a pin 72 extending through a cross bore in a boss 73 at the lower end of the casing 66. Thus, when fluid under pressure is supplied to the lower or head end of the piston 65 to effect extension of the rod 67, the crank portion 71, and consequently the arm 51, will be caused to pivot in a clockwise direction as viewed in FIGS. 2 and 6 about the bolt 58. The arm 51 will thus be caused to rapidly swing from its inoperative position remote from the driver and adjacent to the windshield post 53 (FIGS. 2 and 4) to its operative position in closer proximity to the driver and front seat passengers, as illustrated in FIG. 6.

Swinging movement of the arms 51 and 52 is limited by pocket means carried on the inner sides of the door 21 and 22. Such pocket means preferably comprises a pair of brackets 75 and 76 (FIGS. 1, 2 and 6) which are generally Z-shaped in cross section with the connecting sections of the brackets providing abutment protions, indicated at 74, limiting downward movement of the distal ends 55 of the arms 51 and 52. The brackets 75 and 76 also include laterally inwardly offset flange portions, indicated at 77, which overlap the laterally inner sides of the arms and prevent laterally inward deflection of the distal ends 55 thereof. The brackets 75 and 76 are bolted or otherwise rigidly secured to the inner sides of the doors 21 and 22.

Referring now to FIGS. 8 and 9 in conjunction with FIGS. 1–6, inclusive, the internal construction and manner in which fluid under pressure is supplied to the piston and cylinder assemblies 63 and 64 to effect swinging movement of the arms 51 and 52 will now be described. As best seen in FIG. 8, it will be noted that the inner end of the plunger rod 67 is provided with an enlarged head 82 which is shiftably mounted in an axial bore 83 in the piston 65, the latter being shiftably mounted in the bore, indicated at 86, of the casing 66. On end of a coil spring 87 engages the head 82 of the rod 67 and the opposite end of the spring 87 engages the end wall 88 of a tubular retainer 89 threaded into the skirt of the piston 65. The axial length of the rod head 82 is less than the length of the bore 83 in the piston 65 so as to permit a predetermined amount of relative movement between the rod 67 and piston 65. The reason for this relative movement, which comprises a lost motion connection between the head 82 of the rod 67 and the piston 65, will be described more fully hereinafter.

The lower or pivot end of the casing 66 is closed as by a tubular plug 94 threaded into this end of the casing 66 and having the boss 73 formed integrally therewith. A seal, such as an O-ring 96, may be provided between the mating end faces of the casing 66 and plug 94 to prevent leakage in this area. The inner end face, indicated at 97, of the plug 94 forms a stop for limiting movement of the piston 84 toward the pivot end of the casing 66, and the interior of the plug 94 defines a first chamber 98 in the piston and cylinder assembly 63, which is intersected by a radial bore 101 and 102 in the plug 94 and casing 66, respectively. One end of a conduit 103 is threaded into the bore 102. Thus, when fluid under pressure is supplied to the chamber 98 from the conduit 103, the piston 65 will shift toward the rod end of the cylinder 63 and cause the plunger rod 67 to extend. The arm 51 will thus be caused to swing about its pivot bolt 58, as previously described.

The plunger rod 67 is supported in the rod end of the casing 66 by a bearing 106 mounted in an axial bore 107 in a fitting 108 threaded into the rod end of the casing 66. A seal 109 is provided in the outer end of the fitting 108 and retained therein by a closure plate 110, the plate 110 in turn being secured to the plug fitting 108 by a plurality of screws 111.

The plunger rod 67 also extends through the tubular portion indicated at 112, of a vent valve member 113, the tubular portion 112 including a reduced diameter extension 114 which extends through an opening 116 in an intermediate wall 117 in the casing 66. The wall 117 and fitting 108 define another chamber 118 in the casing 66, and the full diameter or land portion, indicated at 115, of the vent member 113 closely fits but slidably engages the inner surface, indicated at 86a, of the chamber 118. The vent valve member 113 thus comprises vent means for gradually reducing the pressure in the compartment 37 of the bag 35, as will be described in greater detail hereinafter.

Another seal assembly 119 is mounted in a recess 120 in the intermediate wall 117 to prevent leakage of fluid from the chamber 118 through the bore 116 into the reduced diameter portion, indicated at 121, of a chamber 122 on the opposite side of the wall 117. A radial bore 123 is provided in the side wall of the casing 66 on the piston side of the intermediate wall 117, the inner end of the bore 123 communicating with a reduced diameter portion 121 of the chamber 122. One end of a conduit 126 is threaded into the bore 123 and permits fluid under pressure to be supplied to the chamber 122 or removed therefrom as the piston 65 moves toward the rod end of the cylinder.

According to the present invention, after the pistons 65 complete their strokes in the cylinder casings 66 and the arms 51 and 52 have completed their downward swinging movement, fluid under pressure begins to flow into the compartments 37 and 38 of the bag 35. The manner in which this is accomplished is best understood by referring to the fluid circuit diagram illustrated in FIG. 9 in conjunction with FIGS. 1, 2, 4, 5 and 6.

With initial reference to FIGS. 2, 4 and 6, it will be noted that the arms 51 and 52 are hollow and have passages therethrough for conducting fluid under pressure to the compartments 37 and 38 of the bag 35. Thus, the passage through the arm 51 is indicated at 131 in FIGS. 2, 6 and 9, and the passage through the arm 52 is indicated at 132 in FIG. 9. The passages in each arm extend from an enlarged boss 133 adjacent the pivot end thereof to nozzle openings in the distal ends 55 of the arms, the nozzle openings being connected to the bag compartments 37 and 38. Thus, the nozzle opening in the arm 51 is indicated at 137 in FIGS. 1, 3, 5 and 9, and the nozzle opening in the arm 52 is indicated at 138 in FIGS. 1 and 9. The manner in which fluid under pressure is supplied to the passages 131 and 132 in the arms 51 and 52 will only be described in connection with the arm 51, it being understood that the same construction is employed in the arm 52.

In order to communicate fluid under pressure to the passage 131 in the arm 51, a portion, indicated at 139, of the passage 131 in the boss 133 is enlarged and threaded to receive a clamping member of sleeve 140 (FIG. 7). The axially inner end, indicated at 142, of the sleeve 140 may be beveled to mate with a correspondingly beveled internal shoulder or tapered seat 143 at the inner end of the enlarged portion 139. The diameter of the interior, indicated at 141, of the sleeve 140 is such as to permit the end portion, indicated at 144, of a flexible conduit or hose 145 to be received therein when the latter has been expanded by an expander member or bushing 147. The axially inner and outer ends, indicated at 148 and 149, respectively, of the bushing 147 are beveled, and the bevel angle of the inner end 148 is substantially equal to the bevel angle of the internal shoulder 143. The bevel angle of the outer end 149 of the bushing 147 is likewise substantially equal to the bevel angle of an internal shoulder 150 in the sleeve 140. Consequently, the portions of the hose 145 between the shoulder 143 and bushing end 148 and between the shoulder 150 and bushing end 149 are clamped between substantially parallel surfaces.

When operably positioned in the end portion 144 of the hose 145, the bushing 147 defines a pair of external shoulders 151 and 152 on the hose 145 substantially adjacent to the beveled, inner and outer ends 148 and 149 of the bushing. Thus, the internal shoulder 150 of the sleeve 147 will engage the external shoulder 152 of the hose and the external shoulder 151 of the hose will engage the internal shoulder 143 at the inner end of the enlarged passage portion 139 when the sleeve 140 is fully threaded into the boss 133. The inner diameter of the bushing 147 is substantially equal to that of the passage 131 in the arm 51.

Thus, when it is desired to connect the end portion 144 of the hose 145 with the passage 131 in the arm 51, the sleeve 140 is initially slipped over the hose and then the bushing 147 is inserted into the end portion 144 until the remote end of the hose projects somewhat beyond the axially inner end 148 of the bushing 147. The end portion 144 of the hose with the bushing 147 disposed therein is then inserted into the threaded counterbore 139 and the sleeve 140 is then threaded into the counterbore 139 until the portions of the hose between the internal shoulder 143 and inner end 148 of the bushing 147 and between the internal shoulder 150 of the sleeve 140 and the outer end 149 of the bushing 147 are tightly clamped between these structures. To this end, the outer end of the sleeve 140 may be provided with means facilitating the application of torque thereto. Such means preferably comprises a plurality of slots 153 with which a suitable wrench may be engaged. The same structure and procedure may be used to connect the end of a flexible conduit or hose 146 with the passage 132 in the arm 52.

As heretofore mentioned, fluid under pressure from a pair of reservoirs or tanks, which are indicated at 155 and 156 in FIG. 9 and which are preferably mounted outside of the passenger compartment of the vehicle e.g. on the engine compartment firewall, is supplied to the passages 131 and 132 in the arms 51 and 52 by the flexible conduits or hoses 145 and 146, respectively. However, cushioning fluid under pressure in the reservoirs 155 and 156 is prevented from flowing through the hoses 145 and 146 until the system is actuated by cushioning fluid valve means in the form of a pair of normally closed, two-way valve assemblies 161 and 162, respectively.

The cushioning fluid valve assemblies 161 and 162 are identical and are the type requiring a predetermined pilot pressure to be applied thereto before they open. To this end, a pair of conduits, indicated at 163 and 164 in FIG. 9, supply pilot pressure to the valve assemblies 161 and 162 and cause the valves to open when the pilot pressure becomes sufficiently high to overcome the force of springs 165 biasing the valves to their closed positions. The pilot pressure acting on the valve assemblies 161 and 162 will not rise to a value sufficient to open the valves until the volumes of the chambers 98 cease to expand due to the pistons 65 completing their strokes in the cylinder casings 66. Recesses or notches, indicated at 166, are provided in the movable portions of the valve assemblies 161 and 162 for receiving spring biased detents (not shown) which hold the valves in their open positions.

The application of pilot pressure to the valves 161 and 162 is controlled by control valve means, indicated generally at 170, which also controls the application of fluid under pressure from another reservoir or tank 172, which is likewise preferably mounted outside the passenger compartment of the vehicle and on the engine compartment side of the firewall. The tank 172 is connected to the chamber 98 of the piston and cylinder assemblies 63 and 64 and supplies motive fluid thereto to cause the arms 51 and 52 to rapidly swing from their inoperative to their operative positions. The control valve means 170 is preferably of the four-way, two-position, solenoidactuated type having two pairs of passages 173, 174 and 175, 176 therein and is normally biased by a spring 177 to a first or normal position wherein the passage 173 provides communication between a fluid conduit 178 and another fluid conduit 179, which is connected to a pair of branch conduits 181 and 182. The conduit 178 is connected to the reservoir or charge tank 172 and the branch conduits 181 and 182 are connected to another pair of valve means 183 and 184, which are of the two-way, quick-release, pilot-pressure actuated type.

The quick-release valve means 183 and 184 have passages 185a which communicate pilot pressure from the branch conduits 181 and 182 to the valve means to hold them in positions where passages 185b therein connect the branch conduits 181 and 182 with the conduits 126, the conduits 126 comprising third conduit means communicating with the chambers 122 in the piston and cylinder assemblies 63 and 64 as previously described. The valve means 183 and 184 also have passages 185c therein which directly connect the conduits 126, and hence the chambers 122, with vent passages 189 connected to the atmosphere when the valves are shifted by springs 185d to their conduit venting positions.

When the control valve means 170 is in its first position, the passage 174 thereof connects a conduit 186 with a pair of branch conduits 187 and 188, the latter respectively being connected to the conduits 103 of the piston and cylinder assemblies 63 and 74. Consequently, the chambers 98 of the piston and cylinder assemblies 63 and 64 are vented through the branch conduits 187 and 188 and conduit 186 to the atmosphere. The pistons 65 in the piston and cylinder assemblies 63 and 64 are thus biased toward and may engage the end faces 97 of the closure plugs 94, depending upon the adjustment of the linkage between the arms 51 and 52 and plunger rods 67.

Another pair of pilot-pressure actuated, two-way, unloader or exhaust valves 191 and 192 are provided in a pair of conduits 193 and 194, respectively connected to the branch conduits 187 and 188. Pilot pressure from the tanks 155 and 156 is communicated to the exhaust valves 191 and 192 through conduits 195 and 196, the latter conduits being connected to the conduits 145 and 146 upstream from the valves 161 and 162. The purpose and function of the valves 191 and 192 will be more fully described hereinafter.

Shifting of the control valve means 170 to a second position wherein the passage 175 connects the conduit 178 from the charge tank 172 with the conduit 186 and branch conduits 187 and 188, and wherein the passage 176 connects the conduit 179 with the atmosphere so that the chambers 122 in the piston and cylinder assemblies 63 and 64 are connected to the atmosphere, is achieved by a solenoid 197. Current is supplied to the solenoid 197 from an electrical circuit, illustrated in FIG. 10, and in response to control means in the form of a manually actuated trigger switch 200 in the circuit and mounted in the steering column 28. Closure of the switch 200 occurs when the steering wheel of the vehicle is shifted to a position forwardly of its normal operating position. The aforementioned electrical circuit with the switch 200 located therein, is illustrated in FIG. 10.

Figure 10:
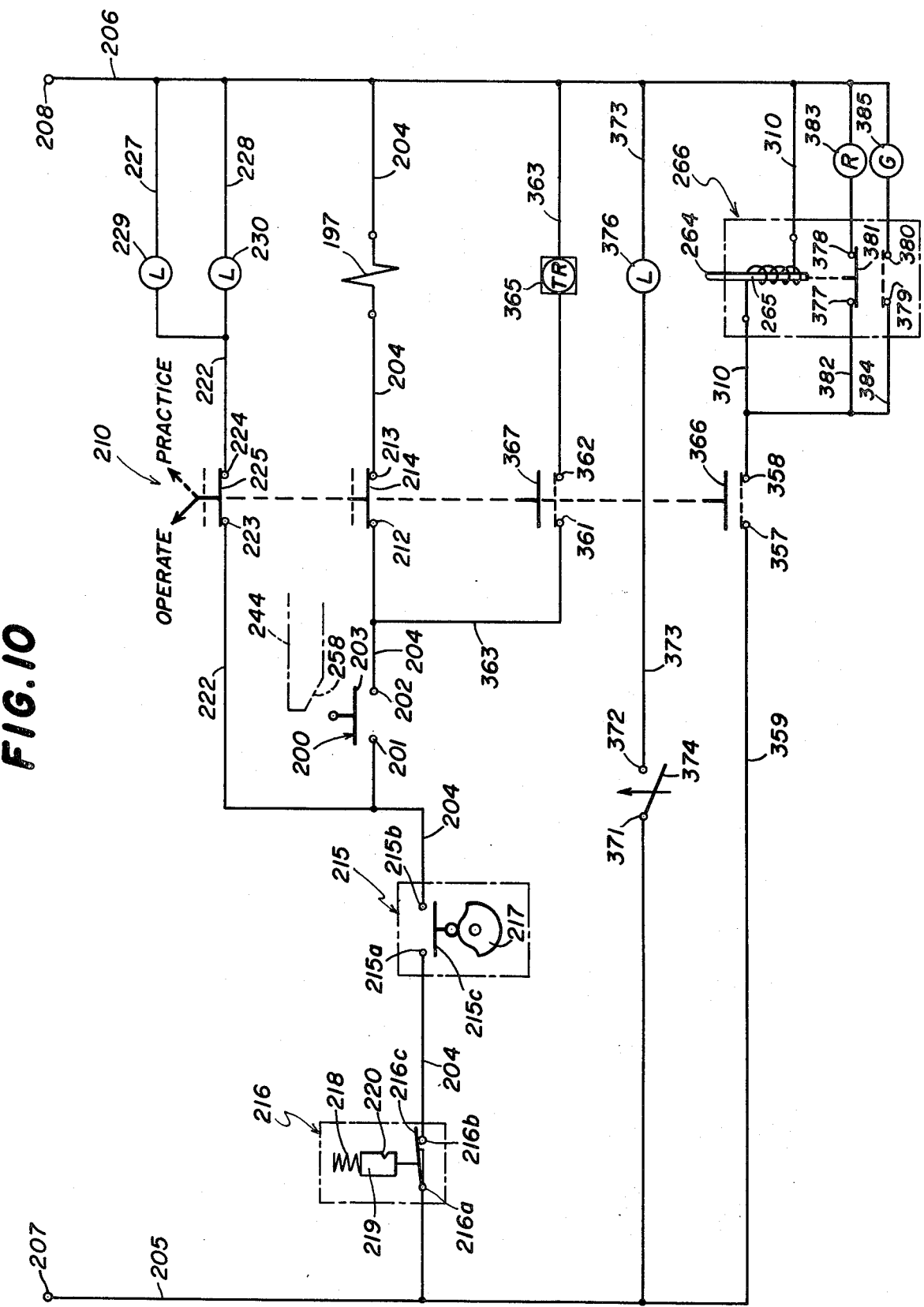
FIG. 10 is a wiring diagram of the electrical circuit of the system.

Referring now to FIG. 10 it will be seen that the solenoid 197 and trigger switch 200 are located in a branch conductor 204 of the electrical circuit, the switch 200 having a fixed pair of contacts 201 and 202 and a movable contact 203. The ends of the branch conductor 204 are respectively connected to supply lines 205 and 206, which have terminals 207 and 208 connected to a suitable source of electrical energy, such as the battery of the vehicle in which the restraint and protection system of the present invention is installed. Closure of the switch 200, which is normally open, to energize the solenoid 197 depends upon the position of another, manually actuated, mode selector switch, indicated generally at 210. The selector switch 210 may be conveniently mounted on the dashboard 26 of the vehicle 20, as shown in FIG. 1, and includes a plurality of pairs of contacts, one pair being indicated at 212 and 213 and being provided in the branch conductor 204 between the trigger switch 200 and the solenoid 197. A movable contact member 214 connects the contacts 212 and 213 of the switch 210 when the latter is in a first or normal position. Such position of the switch 210 is represented by the full line arrow in FIG. 12 and the word "operate".

In addition to the pair of contacts 212 and 213 of the selector switch 210, a switch 215, responsive to the speed of the vehicle 20, and an inertia switch 216, are provided in the series in the branch conductor 204. Thus, the switches 215 and 216 must both be closed in order for the solenoid 197 to be energized upon closure of the switch 200.

The speed responsive switch 215 may be of any desired type but preferably includes a pair of fixed contacts 215a and 215b and a contact member 215c which is movable into engagement with the fixed contacts 215a and 215b by a rotatable cam 217 connected to the drive for the speedometer speed indicator needle. The arrangement is such that the movable contact member 215c will engage the fixed contacts 215a and 215b whenever the vehicle reaches a predetermined speed. It is contemplated that the movable contact member 215c will engage the fixed contacts 215a and 215b when the speed of the vehicle reaches or exceeds about 35 miles per hour.

The inertia switch 216 may be of a type having a pair of fixed contacts 216a and 216b and a movable contact member 216c which is normally biased into engagement with the contacts 216a and 216b by a spring 218. The switch 216 also includes an inertia force responsive element or weight 219 having a recess or notch 220 therein for receiving a detent (not shown) which holds the weight 219 in its accelerated position and the movable contact member 216c separated from the fixed contact 216b.

It is contemplated that the magnitude of the deceleration or acceleration force required to cause the contact member 216c to separate from the contact 216b is less than what occurs in a head-on or side collision and greater than that which occurs with heavy braking, quick maneuvering or maximum acceleration of the vehicle.

As will be apparent from FIG. 10, the electrical circuit of the restraint and protection system of the present invention includes another branch conductor 222 connected to the branch conductor 204 between the trigger switch 200 and the speed responsive switch 215. A pair of fixed contacts 223 and 224 are provided in the branch conductor 222 and a movable contact member 225 which connects the contacts 223 and 224 when the selector switch 210 is in its first or normal operating position.

The opposite end of the branch conductor 222 is connected to a pair of sub-branch conductors 227 and 228, the latter being connected to the main supply line 206. A pair of lamps 229 and 230, or some other suitable signalling means, are provided in the sub-branch conductors 227 and 228 and are preferably positioned on the dash panel 26 and right front door 22, respectively. Note the FIGS. 1, 2 and 6. Thus, the lamps 229 and 230 will be illuminated when the selector switch 210 is in its normal operating position and the speed of the vehicle is greater than that required to effect closure of the speed responsive switch 215. When illuminated, the lamps 229 and 230 inform the driver and passengers of the vehicle that the system is ready for actuation.

Figure 11:
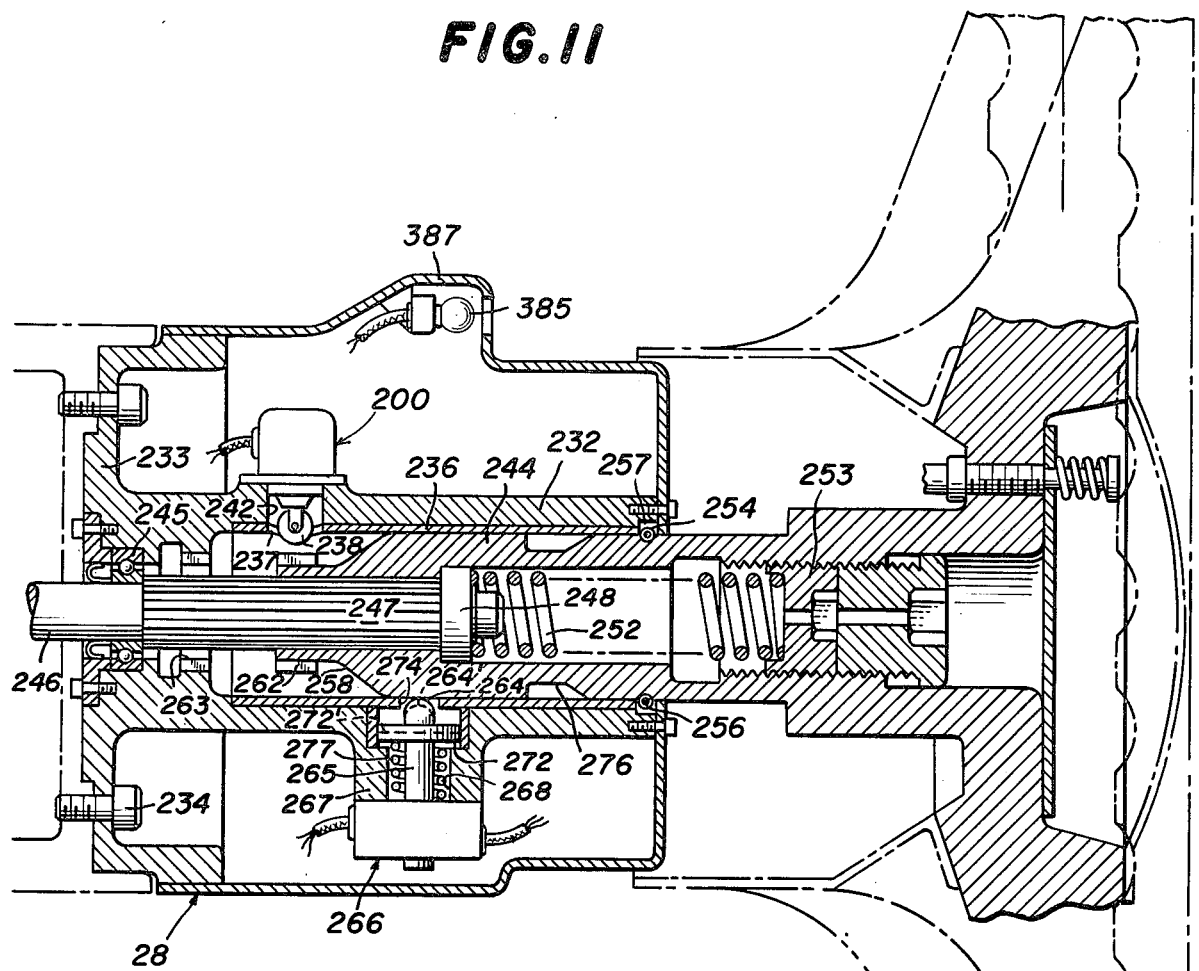
FIG. 11 is a longitudinal sectional view, with some parts in elevation, of a portion of the steering wheel and steering column of an automotive vehicle and showing the spatial relationship of the components of the system when installed in the steering column and with the steering wheel in its normal operating position.
Figure 12:
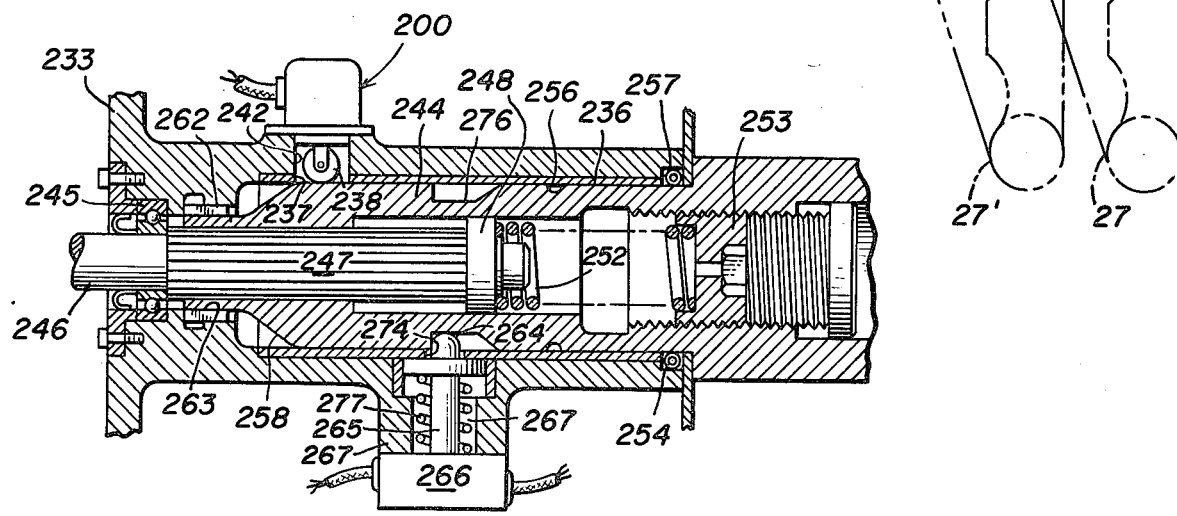
FIG. 12 is a fragmentary sectional view of a portion of the steering column illustrated in FIG. 11 and showing the relationship of the parts of the system when the steering wheel has been shifted inwardly to acutate the system.

Referring now to FIGS. 11 and 12, the location and manner of actuation of the trigger switch 200 will now be described. As best seen in FIG. 11, the trigger switch 200 is mounted internally in the steering column 28 on the exterior of a tubular support member 232. The tubular support member 232 is provided with a mounting flange 233 at its inner end, the flange 233 being secured by a plurality of screws 234 to adjacent structure in the steering column 28. A bearing sleeve 236 is mounted in the tubular support member 232 and has an opening 237 adjacent the axially inner end thereof to permit a roller 238 connected to the movable contact member 203 of the switch 200 to extend through the opening 237 and an aligned opening 242 in the support member 232.

The steering wheel 27 includes a tubular shaft portion 244, which is connected to the hub of the steering wheel 27 and which is axially and rotatably shiftable in the bearing sleeve 236. Rotational movement of the steering wheel 27 is translated to the steering mechanism of the vehicle through another shaft 246, concentric with the tubular shaft portion 244 and secured thereto against relative rotation by splines 247. A bearing assembly 245 supports the shaft 246 in the tubular support member 232 and the splines 247 are of a sufficient length to accommodate a predetermined amount of relative axial movement between the shaft portion 244 and shaft 246. An enlarged head 248 is provided on the outer end of the shaft 246 to limit axially outward movement of the shaft portion 244 and steering wheel 27. The inner end of a coil spring 252 engages the head 248 of the shaft 246 and the outer end of the spring 252 bears against a nut 253 threaded into the tubular shaft portion 244. Consequently, the steering wheel 27 is biased axially outwardly toward its normal or rearward position indicated by the reference numeral 27 in FIG. 11 and in full lines in FIG. 2.

A garter spring 254 is preferably disposed around the tubular shaft portion 244 of the steering wheel 27 and is partially received in an annular groove 256 in the outer periphery of the shaft portion 244. The garter spring 254 also extends into an annular recess 257 in the inner surface of the tubular support member 232. The bearing sleeve 236 terminates adjacent to the groove 256 so that the spring 254 can expand into the recess 257 when the steering wheel 27 and tubular shaft portion 244 are shifted forwardly.

As heretofore mentioned, the trigger switch 200 is adapted to be closed by the driver of the vehicle when sufficient forward force is applied to the steering wheel 27 to overcome the force of the coil spring 252 and the force required to shift the garter spring 254 out of its groove 256 and onto the full diameter of the shaft portion 244. Thus, as the steering wheel 27 and shaft portion 244 move axially inwardly in the tubular member 232, the roller 238 of the trigger switch 200 contacts an annular, tapered surface 258 on the inner end of the tubular portion 244. When the steering wheel 27 reaches its axially inner or system triggering position, indicated at 27' in FIG. 11 and in full lines in FIG. 6, the roller 238 of the trigger switch 200 will have been cammed upwardly or in a direction to cause the movable contact member 203 to engage the contacts 201 and 202, as shown in FIG. 12. Assuming that the speed responsive switch 215 and inertia switch 216 are closed, current will then flow through the branch conduit 204 to energize the solenoid 197 and shift the control valve 170 from its first position illustrated in FIG. 9 to its second position wherein fluid under pressure in the charge tank 172 is supplied to the fluid conduit 186 and its branch conduits 187 and 188, and wherein the fluid conduit 179 and its branch conduits 181 and 182 are vented to the atmosphere through the passage 176 of the valve 170.

The conduit 186 and branch conduits 187 and 188 thus comprise first conduit means for conducting fluid under pressure from the tank 172 or source to first chambers 98 in the piston and cylinder assemblies 63 and 64, and the conduits 145 and 146, together with the passages 131 and 132 in the arms 51 and 52, comprise second conduit means for conducting fluid under pressure to the compartments 37 and 38 of the bag 35 or cushioning means.

Thus, when the chambers 98 of the piston and cylinder assemblies 63 and 64 are charged with fluid under pressure from the tank 172, the arms 51 and 52 will swing rapidly from their inoperative to their operative positions illustrated in FIGS. 1 and 6. Thereafter, fluid under pressure in the tanks 155 and 156 flows into and causes the compartments 37 and 38 of the bag 35 to rapidly inflate and engage the lap and pelvic areas of the driver and any other passengers on the front seat of the vehicle.

According to the present invention, it is desirable to prevent turning of the wheels of the vehicle prior to and after a collision with another vehicle or object. To this end, locking means in the form of an external ring gear 262 on the axially inner end of the shaft 244 is provided for engaging an internal ring gear 263 (FIG. 11) at the inner end of the tubular member 232 for locking the steering of the vehicle 20. FIG. 12 shows the ring gears 262 and 263 in mesh and the steering gear shaft 246 locked against rotation when the steering wheel 27 has been shifted inwardly to its system triggering position.

In order to prevent the driver of the vehicle from pulling the steering wheel 27 rearwardly to interrupt the cycle of operation of the restraint and protection system and thus perhaps cause greater injury to the driver and passengers than would otherwise occur, detent means is provided in the steering column 28 for engaging the tubular shaft portion 244 and for preventing rearward or outward movement of the steering wheel 27 once it has reached its fully inwardly shifted position. Such detent means preferably comprises the radially inner end, indicated at 264, of the armature, indicated at 265, of another solenoid 266 mounted on a boss 267 on the outer periphery of the tubular member 232. The armature 265 extends through a radial bore 268 in the boss 267, which is counterbored to accommodate a disk-like spring retainer 272 adjacent the end 264 of the armature 265. An opening 274 is provided in the bearing sleeve 236 to permit the end 264 of the armature 265 to engage the outer surface of the tubular shaft portion 244 and to extend into an annular groove 276 in the outer periphery of the shaft portion.

The groove 276 is axially positioned on the tubular portion 244 so that the end 264 of the armature 265 will extend into the groove, as shown in FIG. 12, when the external ring gear 262 is fully meshed with the internal ring gear 263. A spring 277 engages the retainer 272 and normally biases the armature 265 inwardly toward the shaft portion 244. Thus, when the driver of the vehicle shifts the steering wheel 27 forwardly to the position thereof indicated at 27' in FIG. 11 and in full lines in FIG. 6, the end 264 of the armature plunger 265 extends into the groove 276 and the steering wheel 27 is retained in its forward position.

With the foregoing construction and assuming that the speed responsive switch 215 and inertia switch 216 are closed, when the solenoid 197 of the control valve 170 has been energized by closure of the trigger switch 200, the downwardly moving arms 51 and 52 will cause the bag 35 to be rapidly deployed and thereafter inflated with pressurized fluid flowing into the compartments 37 and 38 from the tanks 155 and 156. Specifically, about 0.10 to 0.14 seconds will be required to effect complete unfolding and inflation of the bag 35 from the time the trigger switch 200 is closed by forward movement of the steering wheel 27. The rate of movement of the bag 35 toward the driver and passengers on the front seat of the vehicle is about 35 mph during deployment and inflation, which is unlikely to cause any injury to the driver or passengers. Moreover, when the arms 51 and 52 initially reach their operative position illustrated in FIGS. 1 and 6 and the compartments 37 and 38 of the bag 35 are fully inflated, the pressure in the compartments 37 and 38 is about 25 psi.

As previously mentioned, it is desirable to initiate a reduction of pressure in the compartments 37 and 38 after these compartments have been fully inflated and the bodies of the driver and passengers are exerting pressure on the bag 35 in order to prevent the driver and passengers from rebounding from the bag after a collision. To this end, a pair of bleed conduits 283 and 284 (FIGS. 8 and 9) are respectively connected to the conduits 145 and 146, downstream from the cushioning fluid valve assemblies 161 and 162 and to ports 285 in the casings 66, which communicate with the chambers 118 (FIG. 8) in the piston and cylinder assemblies 63 and 64. At least one and preferably a plurality of vent ports 287a–287h are provided in the wall of each casing 66 in axially spaced relation from the ports 285, the full diameter portion 115 of each vent valve member 113 controlling communication between the bleed conduit 283 and vent ports 287a–h.

Since the construction of the vent valve member 113 and the structure utilized in the piston and cylinder assembly 64 to effect gradual reduction of the pressure in the compartment 38 is identical with that utilized in the piston and cylinder assembly 63 to effect gradual reduction of the pressure in the compartment 37, only the vent valve member 113 and the related structure of the piston and cylinder assembly 63 will be described in detail.

Thus, as previously mentioned, the tubular portion 112 of the vent valve member 113 includes a reduced diameter extension 114 which defines a shoulder 286 at the piston end of the tubular portion 112. The shoulder 286 serves as a stop to position the full diameter land portion 115 of the vent valve member 113 in radial alignment with the inner ends of the vent ports 287a-h when the shoulder 286 engages the intermediate wall 117. A coil spring 288 is positioned between the rod end face, indicated at 289, of the tubular portion 112 and the sleeve bearing 106, and biases the vent valve towards the position thereof illustrated in FIGS. 8 and 13 closing the vent ports 287a–h.

Movement of the vent valve member 113 to the position thereof shown in FIG. 14 where the full diameter portion 115 uncovers the vent ports 287a–h and permits communication between the bleed conduit 283 and the vent ports does not take place when the piston 65 completes its stroke and the rod end face, indicated at 290, of the piston 65 engages a shoulder 291 at the rod end of the chamber 122, as indicated in FIG. 13. Instead, movement of the vent valve member 113 to the position shown in FIG. 14 occurs after a shoulder 292 at the piston end of the rod 67 engages the end face, indicated at 293, of the extension 114 and the rod 67 moves outwardly relative to the piston 65 until the spring 288 becomes completely compressed. The spring 288 also prevents movement of the vent valve member 113 as a result of increased pressure in the chamber 122 due to movement of the piston 65.

The aforementioned additional incremental movement of the rod 67 relative to the piston 65 occurs as a result of movement of the arm 51 from its operative position to a vent position wherein the arm engages the abutment portion 74 (FIG. 1) of its bracket 75, the latter movement being due to the forwardly directed force of the body of the driver and front seat passengers acting on the bag 35 due to a collision. Prior to the application of this force on the bag 35, the arm 51 is in its operative position and is slightly spaced from the abutment portion 74 of its bracket 75 and the head 82 of the rod is engaged with the inner surface, indicated at 295, of the piston 65, as shown in FIG. 13. However, when the collision occurs, the arm 51 moves from its operative to its vent position, the rod 67 extends, the vent valve member 113 shifts and the ports 287a–h are uncovered. Consequently, fluid under pressure in the compartment 37 will be reduced at a rapid, controlled rate due to the orifice action of the vent ports 287a–h, thereby preventing the bag 35 from remaining fully inflated and the driver and passengers rebounding from the bag in the event of secondary impacts to the vehicle 20.

Since the springs 87 and 288 oppose movement of the plunger rod 67 beyond its normal extended position, the rod 67 will retract into the cylinder 63 to the position thereof shown in FIG. 13 as soon as the force applied to the bag by the bodies of the driver and passengers has dissipated. The spring 288 will then shift the vent valve member 113 toward the wall 117 and block the vent ports 287a–h. Consequently, the compartment 37 of the bag 35 will remain partially inflated after the first impact and thus provide additional protection to the driver and passengers in case of secondary impacts.

Free movement of the vent valve member 113 in its bore 86a is provided for by at least one and preferably a plurality of arcuate, pressure equalization ports (FIGS. 8, 13, 14 and 15) in the full diameter portion 115 of the vent valve member 113.

In FIGS. 16 and 17, an alternate vent valve construction is illustrated for connecting the bleed conduit 283 with the vent ports 287a–h in the piston and cylinder assemblies of the system. Since identical constructions will be used in both piston and cylinder assemblies, the arrangement and related structure of only one of the piston and cylinder assemblies will be described in detail, namely the piston and cylinder assembly 63a connected to the arm 51. Like reference numerals will be used to identify parts identical with those of the previous embodiment.

The vent valve construction illustrated in FIGS. 16 and 17 thus includes a vent valve member 313, which is similar to the vent valve member 113 in that the valve member 313 includes a tubular portion 312 and a full diameter or land portion 315 at the rod end of the tubular portion. The tubular portion 312 is slidably mounted on a plunger rod 67a, which is shiftably mounted in the casing 66a of the piston and cylinder assembly 63a, and the full diameter portion 315 closely fits but slidably engages the inner surface 316 of a vent chamber 318 at the rod end of the casing 66a. A closure fitting 322, similar to but shorter in length than the closure fitting or plug 108, is threaded into the rod end of the casing 66a and serves to define the chamber 318. A coil spring 323 is received in an annular clearance in the fitting 322, the spring 323 serving to bias the vent valve member 313 toward the intermediate wall 117 of the casing 66a to a position where the full diameter portion 315 of the valve member closes the vent ports 287a–h.

Axial movemement of the vent valve member 313 from a position wherein the end face, indicated at 326, of the tubular portion 312 engages the adjacent surface, indicated at 327, of the intermediate wall 117 to the position thereof illustrated in FIG. 16 where the spring 323 is completely compressed and the full diameter portion 315 moves past the vent ports 287a–h so as to permit communication between the bleed conduit 283 and vent ports is achieved by locking means carried by the tubular portion 312 of the vent valve member 313. Such locking means preferably comprises at least one and preferably three circumferentially spaced, radially shiftable detents 332a–c (FIG. 17) slidably mounted in cup-shaped housings 333 having their open ends threaded into radial bores 334 in the tubular portion 312.

The detents 332a–c are biased radially inwardly toward the plunger rod 67a by springs 336 mounted in the housings 333 and are adapted to extend into an annular groove 337 in the plunger rod 67a. The groove 337 is positioned in the rod 67a so that the detents 332a–c move into the groove 337 when the rod end face, indicated at 341, of the piston, indicated at 342, of the assembly engages a shoulder 343 defined by a reduced diameter portion 121a at the rod end of the cylinder bore 86.

As in the previous embodiment, engagement of the end face 341 of the piston 342 with the shoulder 343 does not effect movement of the vent valve member 313 to its FIG. 16 position establishing communication between the bleed conduit 283 and the vent ports 287a–h. Instead, such movement depends upon an additional incremental amount of movement of the plunger rod 67a relative to the piston 342 and occurs when the arm 51 is caused to move from its operative position to a vent position wherein the arm 51 engages the abutment portion 74 of its bracket 75 due to the forwardly acting force of the body of the driver and passengers on the front seat of the vehicle on the deployed and inflated bag 35.

Thus, when the torsos of the driver and passengers engage the deployed and inflated bag 35, a sufficient force will be applied to the plunger rod 67a to overcome the force of a spring 344 disposed between the enlarged head, indicated at 345, of the rod 67a and a retainer 346 secured to the skirt of the piston and to shift the rod outwardly in the cylinder 66a to the position thereof illustrated in FIG. 16. Such additional movement is provided for by the excess length of the bore, indicated at 347, in the piston 342, with respect to the axial length of the enlarged head 345 on the piston end of the rod 67a. Communication is thus established between the bleed conduit 283 and the vent ports 287a–h so that pressure in the compartment 37 is reduced at a controlled rate as long as the forwardly acting force of the bodies of the driver and passengers on the bag 35 continues. However, this force usually dissipates shortly after the initial impact of a collision. Consequently, the springs 344 and 323 will cause the rod to retract into the cylinder and shift the valve member 313 to its former position closing the vent ports 287a–h. Gradual deflation of the bag 35 to prevent the driver and passengers from rebounding from the bag in the event of secondary impacts to the vehicle 20 is thus provided for by the vent valve member 313.

The full diameter portion 315 of the vent valve member 313 is likewise preferably provided with a plurality of arcuate, pressure equalization ports 296a to facilitate movement of the valve member 313 in the chamber 318.

As previously mentioned, a pair of pilot pressure actuated exhaust valves 191 and 192 are connected to the branch conduits 187 and 188 by conduits 193 and 194. The exhaust valves 161 and 162 serve to relieve any residual pressure in the branch conduits 187 and 188 and consequently in the chambers 98 of the piston and cylinder assemblies 63 and 64 when the pressure in the tanks 155 and 156 falls to atmospheric or some other low value. When the chambers 98 are connected to the atmosphere, the driver and/or the passengers may lift the bag 35 and swing the arms 51 and 52 upwardly toward the windshield posts 53 and 54 in order to get out of the vehicle.

As heretofore mentioned, the occupant restraint and protection system of the present invention incorporates a practice mode of operation to permit the driver of the vehicle to simulate activation of the system and thereby gain confidence in the reliability of the system and also to gauge the space travelled by the vehicle in which the system is installed during the time interval from the instant the system is triggered by inward movement of the steering wheel 27 until the bag 35 would be fully deployed and inflated. To this end, the selector switch assembly 210 of the electrical circuit of the system includes two additional sets of contacts namely a pair of fixed contacts 357 and 358 in a branch conductor 359 of the circuit and in series with the windings of the solenoid 266, and another pair of contacts 361 and 362 in another branch conductor 363, the contacts 361 and 362 being in series with a timer 365 in the branch conductor 363. Movable contact members 366 and 367 provide or prevent current flow across the pairs of contacts 357, 358 and 361, 362, respectively.

The timer 365 includes a pair of contacts 371 and 372 in another branch conductor 373 and controls the position of a movable contact member 374 which connects and disconnects the contacts 371 and 372. Signalling means in the form of a lamp 376 is provided in the conductor 373, illumination of the lamp 376 comprising a signal corresponding to the instant when the bag 35 would be fully deployed and expanded in its operative position. Preferably, the lamp 376 is mounted in a prominent location on the vehicle 20 so as to be visible to the driver while the driver is observing objects through the front windshield during a simulated collision. One such location for the lamp 376 is the hood 23 of the vehicle 20, as shown in FIG. 1.

The solenoid 266 also includes two additional pairs of contacts 377, 378 and 379, 380, which are alternately connected by a contact member 381 movable in response to movement of the solenoid armature 265. The contacts 377 and 378 are in a parallel branch conductor 382 having signalling means in the form of a red lamp 383 therein and the contacts 379 and 380 are in another branch conductor 384 having a signalling means in the form of a green lamp 385 therein. Physically, the red and green lights 383 and 385 are positioned in a housing 387 (FIGS. 1, 10 and 11) on the upper portion of the steering column 28 of the vehicle so as to be readily visible by the driver.

Thus, when the movable contact members 366 and 367 are in their broken line positions illustrated in FIG. 10, current will flow through the windings of the solenoid 266 and cause the armature 265 to retract radially outwardly against the force of the spring 277, as shown by the broken line positions of the detent end of the armature and spring retainer and indicated at 264' and 272' in FIG. 11, respectively. When the plunger 265 is in its broken line retracted position illustrated in FIG. 11, the movable contact member 381 will be in engagement with the contacts 379 and 380. Consequently, the green light 385 on the steering column 28 will be illuminated. The driver is thus made aware of the fact that the detent end 264 of the solenoid plunger 265 will not move into the groove 276 in the shaft portion 244 of the steering wheel assembly 27 when the latter is shifted forwardly to its system actuating position 27'.

If the armature 265 does not retract when the selector switch 210 is shifted to its "practice" position, due to a defective solenoid, for example, the armature 265 will remain in its full line position illustrated in FIG. 11 and the red light 383 will be illuminated. The driver should then not attempt to operate the system in its practice mode. If neither the red light 383 or green light 385 is illuminated when the switch 210 is shifted to its "practice" position, the driver should likewise not attempt to operate the system in its practice mode.

Closure of the movable contact member 367 sets up the branch circuit 363 so that current will flow through the timer motor 365 whenever the trigger switch 200 is closed. Thus, with the switch 210 in its "practice" position, the timer motor 365 will be energized whenever the trigger switch 200 is closed by forward movement of the steering wheel 27. After the timer motor 365 cycles, the movable contact member 374 of the timer 365 connects the contacts 371 and 372 and causes the lamp 376 on the hood 23 of the vehicle to be illuminated. The time interval for this to occur after forward shifting of the steering wheel 27 is about 0.125 seconds.

NORMAL OPERATION OF THE VEHICLE OCCUPANT RESTRAINT AND PROTECTION SYSTEM

Assuming that the occupant restraint and protection system of the present invention has been properly installed in an automotive vehicle, such as the vehicle 20, i.e. the bag 35 is folded and stored in the compartment 44 in the roof 24 of the vehicle 20, the tanks 155 and 156 and 172 are charged with a suitable fluid under pressure, such as compressed air, and the mode selector switch 210 (FIG. 1) on the dashboard 26 of the vehicle is in its "operate" position, the system is ready for operation by the driver in the event of a collision.

Assuming now that the vehicle 20 is underway and has reached a speed in excess of about 35 miles per hour, the movable contact member 215c (FIG. 10) will close the contacts of the speed responsive switch 215 and thereby permit current flow through the branch conductor 204 of the circuit. It is further assumed that the movable contact member 216c of the inertia switch 216 remains in contact with the fixed contacts 216a and 216b of this switch due to the absence of any inertial loads on the vehicle sufficient to open the same.

Positioning of the selector switch 210 in its "operate" position causes the movable contact members 214 and 225 to engage their fixed contacts 212, 213 and 223, 224, respectively, so that the normally open, driver actuated trigger switch 200 controls current flow through the windings of the solenoid 197 (FIGS. 9 and 10) of the master control valve assembly 170. Engagement of the movable contact member 225 with the fixed contacts 223 and 224 causes the lights 229 and 230 on the dashboard 26 and inner side of the right door 22 (FIGS. 1 and 10) of the vehicle 20 to be illuminated so that the driver and passengers are alerted to keep their arms away from the doors or at least clear of the brackets 75 and 76 (FIG. 1) into which the swingable arms 51 and 52 will move.

Positioning of the selector switch 210 in its "operate" position also moves the movable contact members 366 and 367 away from their fixed contacts 357, 358 and 361, 362, respectively. Consequently, no current will flow through the windings of the solenoid 266 (FIGS. 10, 11 and 12) in the steering column 28 so that the detent end 264 of the armature 265 of the solenoid 266 will be free to move inwardly into engagement with the notch 276 of the steering wheel shaft 244 when the steering wheel is shifted forwardly to its triggering position, illustrated in full lines in FIG. 6 and in phantom lines and indicated at 27′ in FIG. 11. Separation of the movable contact member 367 from its contacts 361 and 362 also prevents energization of the timer 365 (FIG. 10) and illumination of the light 376 (FIGS. 1 and 10) on the hood 23 of the vehicle.

So long as the solenoid 197 of the control valve 170 remains deenergized due to separation of the contacts of the trigger switch 200, fluid under pressure from the tank 172 (FIG. 9) is supplied to the rod end faces of the pistons 65 (FIG. 8) in the cylinder assemblies 63 and 64 so that the actuating rods 67 thereof are maintained in their retracted positions shown in FIGS. 2, 4 and 8. Pressure in the branch conduits 181 and 182 also maintains the quick-release, two-way valves 183 and 184 in the positions thereof preventing fluid flow through the vent passages 189 of these valves.

The downward or retracting force applied to the crank portions 71 of the arms 51 and 52 by the rods 67 also holds the arms 51 and 52 in their upwardly inclined inoperative positions adjacent the left and right windshield posts 53 and 54 of the vehicle, as shown in FIGS. 2 and 4.

Assuming now that the driver of the vehicle observes a traffic hazard of sufficient probable danger to justify actuation of the restraint and protection system of the present invention, he need only exert sufficient forward pressure on the steering wheel 27 of the vehicle to overcome the force of the spring 252 and the resistance to movement of the garter spring 254 out of its groove 256 and cause the wheel and its tubular portion 244 (FIG. 11) to telescope into the steering column 28 a sufficient distance to close the switch 200 and trigger the operation of the system. Triggering or closure of the switch 200 occurs sometime after the roller 238 of the switch engages and begins to roll up onto the tapered portion 258 of the steering wheel shaft 244 since the roller 238 is connected to the movable contact member 203 of the switch. Closure of the switch 200 energizes the solenoid 197 and causes the control valve 170 (FIG. 9) to shift against the force of the spring 177 to a position where the passage 175 connects the conduit 178 from the tank 172 to the conduit 186 and the passage 176 connects the conduit 179 to the atmosphere. Once the control valve 170 has shifted to its aforementioned position, it remains in this position due to the engagement of a detent (not shown) in the recess 180 of the control valve 170.

Forward movement of the steering wheel 27 to its broken line position 27′ in FIG. 11 also results in interlocking of the external and internal ring gears 262 and 263 so that rotation of the steering wheel 27 in either direction is prevented. In addition, the detent end 264 of the armature 265 of the solenoid 266 moves into the annular groove 276 in the tubular shaft portion 244 of the steering wheel assembly, thereby preventing the driver from pulling the steering wheel rearwardly and opening the trigger switch 200 to interrupt the cycle of operation of the system.

Shifting of the control valve 170 to its second or system operating position permits fluid under pressure from the tank 172 to flow into the chambers 98 (FIG. 8) of the piston and cylinder assemblies 63 and 64 through the branch conduits 187 and 188. Consequently, the pistons 65 rapidly shift toward the rod ends of the cylinders and cause the plunger rods 67 to extend. Extension of the plunger rods 67 causes the arms 51 and 52 to rapidly pivot from their inoperative positions adjacent the windshield posts 53 and 54 toward their operative positions embraced by the brackets 75 and 76 (FIG. 1).

After the pistons 65 have completed their strokes and the end faces 290 of the pistons have engaged the shoulders 291 at the rod ends of the cylinders, pilot pressure in the branch conduits 187 and 188 will rise to a value sufficient to shift the normally closed two-way valve assemblies 161 and 162 (FIG. 9) to their open positions. When so shifted, the valve assemblies 161 and 162 are held in an open position by detents (not shown), which extend into the recesses 166 of these valves.

When the valve assemblies 161 and 162 are in their open positions, fluid under pressure in the tanks 155 and 156 flows through the conduits 145 and 146 to the passages 131 and 132 in the arms 51 and 52 and thence into the inflatable compartments 37 and 38 of the bag assembly 35. Thus, the compartments 37 and 38 of the bag assembly 35 are rapidly filled with fluid under pressure after the bag has been withdrawn from its storage compartment 44 and is unfolded. In other words, unfolding or deployment of the bag and inflation thereof take place in sequence. When fully deployed and inflated, the bag 35 exerts a substantial downward and rearward pressure on the pelvic areas and chests of the driver and passengers on the front seat of the vehicle, thereby preventing the driver and passengers from moving forwardly in the vehicle and injuring themselves against the internal structure thereof when the collision occurs.

When the forwardly moving bodies of the driver and passengers contact the bag 35, the force is transmitted to the arms 51 and 52 to cause them to shift downwardly into engagement with the abutment portions 74 (FIG. 1) of the brackets 75 and 76. This additional movement of the arms 51 and 52 causes the rods 67 to extend the additional amount provided by the clearance between the heads 82 on the ends of the rods 67 and the end faces 294 of the retainers 89. Such additional extension also results in the shoulders 292 on the plunger rods 67 engaging the end faces 293 of the tubular extensions 114 of the vent valve members 113 and causing the vent valve members 113 to shift to a position establishing communication between the conduits 283 and 284 (FIG. 14). Consequently, pressure in the compartments 37 and 38 of the bag 35 is gradually vented to the atmosphere at a controlled rate through the vent ports 287a–h in the rod end of the cylinder casings 66. Such venting continues so long as the bodies of the driver and/or passengers on the front seat of the vehicle are in contact with the bag 35 and are extending forward force thereon sufficient to overcome the force of the springs 87 and 288.

In the alternate piston and cylinder construction 63a shown in FIGS. 16 and 17, shifting of the vent valve members 313 to the positions thereof shown in FIG. 16 where the vent ports 287a–h are uncovered and communication is established between the conduits 283 and 284 is achieved by the spring biased detents 332a–c and groove 337 in the plunger rods 67a. Thus, when the end faces 326 of the tubular portions 312 of the vent valve members 313 are engaged with the adjacent surfaces 327 of the intermediate walls 117 and the end faces 341 of the retainers 346 of the pistons 342 are engaged with the shoulders 343 at the rod end the cylinder bores 86, the detents 332a–c shift into the groove 337 and lock the vent valve members 313 to the plunger rods 67a. Consequently, the additional extension of the plunger rods 67a provided by the excess length of the bores 347 in the pistons 342 with respect to the axial lengths of the rod heads 345 will cause the vent valve members 313 to shift to their FIG. 16 position and permit the pressure in the bag compartments 37 and 38 to be gradually reduced in the same manner as the vent valve members 113.

As soon as the initial impact force has dissipated, the arms 51 and 52 will move upwardly a slight distance away from the abutment portion 74 of their brackets 75 and 76. Consequently, the plunger rods 67 retract into their cylinders due to the force of the springs 89 and 288 and the vent valve members 113 shift to their positions shown in FIG. 13 closing the vent ports 287a–h. Further venting of fluid from the compartments 37 and 38 of the bag 35 is thus prevented. However, in the event of a multiple collision accident, further venting of the compartments 37 and 38 through the vent ports 287a–h via the branch bleed conduits 283 and 284 will again take place whenever the forward momentum of the bodies of the driver and passengers is sufficient to cause the arms 51 and 52 to move downwardly and engage the abutment portions 74 of their brackets 75 and 76.

The vent valve members 313 will likewise shift to positions closing the ports 287a–h when the forward force of the driver and passengers on the bag 35 has dissipated and will shift to positions permitting further venting of the compartments 37 and 38 in the event of subsequent collisions.

Gradual deflation of the bag 35 is advantageous in that the bag is also available to protect the passengers in the event of a rollover since the bag tends to hold the passengers in their seats.

PRACTICE OPERATION OF THE VEHICLE OCCUPANT RESTRAINT AND PROTECTION SYSTEM

Assuming that the driver of the vehicle wishes to simulate actuation of the system to become familiar with the time interval involved to effect complete deployment and inflation of the bag 35 from the instant the steering wheel 27 is shifted forwardly to actuate the system and to get some idea as to the distance that would be travelled by the vehicle during this time interval, the system may be operated in a practice mode for these purposes. Thus, assuming the driver is traveling down the highway at a speed in excess of 35 miles per hour and he desires to set up the system for its practice mode of operation, he need only manually shift the selector switch 210 from its "operate" to its "practice" position illustrated in broken lines in FIG. 10.

Shifting of the switch 210 to its practice position causes the movable contact members 214 and 225 to separate from their fixed contacts 212, 213 and 223, 224, respectively. Thus, the solenoid 197 (FIGS. 9 and 10) of the control valve 170 will not be energized and the lamps 229 and 230 (FIGS. 1, 2, 6 and 10) on the dashboard 26 and right side door 22 of the vehicle will not be illuminated. Shifting of the selector switch 210 to its "practice" position also causes the movable contact members 366 and 367 to move into engagement with their fixed contacts 357, 358 and 361, 362, respectively. Consequently, current is supplied to the windings of the solenoid 266 (FIGS. 10–12, inclusive) so that the armature 265 of the solenoid 266 will retract into its broken line position illustrated in FIG. 11. Therefore, the detent end 264 of the solenoid armature 265 will not extend into the annular groove 276 in the tubular steering wheel shaft 244 when the steering 27 is shifted forwardly by the driver to its system triggering position illustrated in full lines in FIG. 6 and in phantom lines in FIG. 11 and indicated at 27'. When the armature 265 of the solenoid 266 is in its retracted position, the movable contact 381 (FIG. 10) will be in engagement with the fixed contacts 379 and 380 so that the green light 385 in the housing 387 (FIGS. 1, 2 and 6) on the steering column 28 of the vehicle is illuminated. The driver is thus made aware of the fact that the armature 265 is retracted so that the steering wheel 27 can be pulled rearwardly into its normal, unlocked position after the same has been shifted forwardly to its system triggering position when the internal and external ring gears 262 and 263 on the shaft portion 244 and support member 232 are meshed.

If the armature 265 does not retract to its broken line position illustrated in FIG. 10, the movable contact member 381 will remain in engagement with the fixed contacts 377 and 378. Consequently, the red light 383 will be illuminated and the driver should not attempt to operate the system in its practice mode.

Engagement of the movable contact member 367 with its fixed contacts 361 and 362 also sets up the circuit so that when the triggering switch 200 is closed, the timer motor 365 will be energized and the light 376 (FIGS. 1 and 10) on the hood 23 of the vehicle will be illuminated when the timer completes its cycle. Such cycle is of short duration (about 0.10 to 0.14 seconds) and is substantially equal to the time required for the arms 51 and 52 to swing downwardly and unfold the bag 35 and also for the compartments 37, 38 and 39 of the bag 35 to become fully inflated.

As soon as the timer 365 has cycled and the light 376 has been illuminated, the driver may release his forward pressure on the wheel 27 to permit the spring 252 (FIGS. 11 and 12) to shift the wheel 27 rearwardly to its normal operating position illustrated in full lines in FIG. 2 and in phantom lines in FIG. 11 and indicated at 27. The steering wheel 27 will, however, become locked against rotation when shifted forwardly to its system triggering position because of the meshed relation of the ring gears 262 and 263. The driver may operate the system in its "practice" mode as often as desired but subsequent practice operations should not be made before the timer 365 has completed its cycle.

From the foregoing description, it will be apparent that the occupant restraint and protection system herein disclosed possesses many advantages over systems heretofore developed and presently in use in that it permits the driver to decide when the system is to be triggered and also provides greater protection to the driver and passengers on the front seat of the vehicle after the system has been actuated than is provided by existing systems.

Moreover, the system herein disclosed also minimizes the risk of injury to the driver and passengers during deployment and inflation of the bag and also protects the driver and passengers in the event that the vehicle rolls over because the bag will hold the driver and passengers in their seats. In addition, the provision for effecting gradual deflation of the bag after initial inflation reduces the possibility of injury to the driver and front seat passengers due to their rebounding from the bag.

The occupant restraint and protection system is also superior to systems heretofore advanced in that because of the simplicity, reliability and reduced number of components thereof, the overall reliability of the system is much greater than existing systems.

I claim:

1. A system for restraining and protecting the driver and passengers of an automotive vehicle against injury as a result of a collision of the vehicle with another object, said vehicle including a vehicle body having laterally spaced windshield posts for supporting a windshield, a dashboard, the lower ends of said windshield posts intersecting said dashboard, a front seat for supporting the driver and one or more passengers in said vehicle body, and a roof overlying said seat, said system comprising expansible cushioning means adapted to be mounted on the underside of the roof of said vehicle body in a collapsed, inoperative position and expandable to an operative position engaging the laps and pelvic areas of the driver and passengers seated on the front seat of said vehicle body so as to restrain said driver and passengers against forward movement in said vehicle body and thereby prevent injury thereto in the event of a collision, a pair of elongated, laterally spaced arms adapted to be mounted in said vehicle body for movement about axes located adjacent to the intersection of the lower ends of said windshield posts with said dashboard and from inoperative positions adjacent to said windshield posts to operative positions wherein one end of each arm is disposed generally adjacent to the knees of the driver and passengers, said ends of said arms being connected to said cushioning means and operable to extend and hold the latter in its operative, expanded position extending laterally across the front seat of said vehicle body and engaging the laps and pelvic areas of the driver and passengers, and actuating means for effecting movement of said arms from their inoperative to their operative positions and expansion of said cushioning means.

2. The restraint and protection system of claim 1, in which said cushioning means has a laterally extending lower edge portion, and said lower edge portion engages the driver and passengers on said front seat between the knees and middle of the thighs of the driver and passengers when said arms are in their operative positions and before said cushioning means expands.

3. The restraint and protection system of claim 1, in which said arms have crank portions, and said actuating means includes means engaging said crank portions and effecting movement of said arms to and holding the same in their operative positions.

4. The restraint and protection system of claim 1, in which the axis about which each of said arms move is inclined downwardly and forwardly with respect to a horizontal axis extending laterally of said vehicle body, whereby said arms swing in arcs which lie in laterally spaced planes inclined inwardly and toward the front end of said vehicle body.

5. The restraint and protection system of claim 1, in which said vehicle body has side doors, and said arms are generally disposed in a somewhat downwardly inclined position and adjacent to said side doors when said arms are in their operative positions.

6. The restraint and protection system of claim 5, in which pocket means is carried on each of the side doors of said vehicle body for receiving a portion of a respective one of said arms and preventing laterally inward deflection thereof when said arm is subjected to stresses from said cushioning means.

7. The restraint and protection system of claim 6, in which each pocket means comprises a bracket secured to the inner side of each of said doors and having an abutment portion and a flange portion, said flange portion overlapping the laterally inner side of said arm and preventing said laterally inward deflection thereof when said arm is subjected to stresses from said cushioning means.

8. The restraint and protection system of claim 1, in which said arms have passage means therethrough for conducting fluid under pressure to said expansible cushioning means.

9. The restraint and protection system of claim 8, in which each of said arms has a pivot end and a distal end, an outlet port is provided in the distal end of each arm, and said outlet ports communicate with the interior of said cushioning means.

10. The restraint and protection system of claim 9, in which said expansible cushioning means comprises a flexible material bag having a pair of laterally spaced, compartments therein, and the outlet ports in said arms respectively communicate with said compartments.

11. The restraint and protection system of claim 10, in which said bag has another compartment disposed between said laterally spaced pair of compartments, and said other compartment has a port therein communicating with the atmosphere, whereby said other compartment fills with air at substantially atmospheric pressure as said laterally spaced compartments fill with fluid under pressure and expand.

12. The restraint and protection system of claim 1, in which each of said arms has a pivot end and a distal end, said cushioning means comprises a flexible material bag, and a laterally extending band of strengthening material is secured to the distal ends of said arms and said bag, said strengthening material reinforcing the central portion of said bag and limiting forward deflection thereof.

13. The restraint and protection system of claim 1, in which said expansible cushioning means comprises a bag having an upper, laterally extending marginal edge, and an elongated, laterally extending section of generally transparent, flexible material secured along its lower edge to the upper marginal edge of said bag, the upper edge of said section of material being secured to structure on the roof of said vehicle body, said generally transparent material section being of sufficient vertical length to permit the driver to see through said section and the windshield of said vehicle.

14. The restraint and protection system of claim 13, in which said section of generally transparent, flexible material is of an open weave netting.

15. The restraint and protection system of claim 13, in which an elongated storage compartment is secured to the underside of the roof of said vehicle body and extends laterally thereof so as to generally overlie the knees of the driver and passengers on the front seat of said vehicle, the upper edge of said transparent material section is secured to said storage compartment, and said bag is stored in a folded condition in said compartment.

16. The restraint and protection system of claim 15, in which said compartment has an open bottom, a door closes the open bottom of said compartment, and said arms hold said door closed and said bag in said folded condition when said arms are in their inoperative positions.

17. The restraint and protection system of claim 1, in which said actuating means includes fluid pressure actuated means connected to said arms and operable to effect said movement of said arms from their inoperative to their operative positions, said actuating means also including means for supplying fluid under pressure to said cushioning means, and vent means for controlling communication between said cushioning means and the atmosphere, said vent means being operable to permit communication between said cushioning means and the atmosphere so as to relieve pressure in said cushioning means at a controlled rate in response to movement of said arms from their operative positions to vent positions, said arms being movable from said operative positions to said vent positions as a result of the force exerted on said cushioning means by the bodies of the occupants of said vehicle during a collision.

18. The restraint and protection system of claim 17, in which the fluid pressure actuated means of said actuating means comprises at least one elongated cylinder having a bore therein and a piston shiftably mounted in said bore, said piston defining first and second chambers in said cylinder on opposite sides thereof, one end of an elongated rod extending through said second chamber and connected to said piston, the other end of said rod being connected to at least one of said arms, first conduit means connecting said fluid pressure actuated means with a source of motive fluid under pressure, said first conduit means communicating with said first chamber, means for applying motive fluid under pressure to said fluid pressure actuated means comprising control valve means in said first conduit means, said control valve means being movable from a first position preventing fluid under pressure from said source from flowing to said fluid pressure actuated means to a second position permitting fluid under pressure from said source to flow to said fluid pressure actuated means, and triggering means for effecting movement of said control valve means from said first position to said second position, whereby fluid under pressure in said first chamber causes movement of said piston in a direction to effect extension of said rod and movement of said arms to their operative positions.

19. The restraint and protection system of claim 18, in which said actuating means includes second conduit means connecting said cushioning means with a source of fluid under pressure separate from said motive fluid source, and cushioning fluid valve means is provided in said second conduit means for controlling the flow of fluid under pressure from said second source to said cushioning means, said cushioning fluid valve means being normally closed and movable to an open position in response to the application of pilot pressure thereto from said first conduit means.

20. The restraint and protection system of claim 19, in which detent means is provided for holding said cushioning fluid valve means in an open position.

21. The restraint and protection system of claim 19, in which said actuating means includes third conduit means, one end of said third conduit means is connected to said second conduit means between said cushioning fluid valve means and said cushioning means, the other end of said third conduit means communicates with a third chamber in said cylinder separate from said first and second chambers, and said vent means is operable to connect said third chamber with the atmosphere to relieve pressure in said second conduit means and said cushioning means.

22. The restraint and protection system of claim 21, in which the other end of said third conduit means is connected to an inlet port in said cylinder, said inlet port communicates with said third chamber, at least one vent port is provided in said cylinder in communication with said third chamber and spaced from said inlet port, and said vent means comprises a vent valve member mounted in said third chamber and shiftable between a first position preventing communication between said inlet port and said vent port and a second position permitting communication between said inlet and vent ports.

23. The restraint and protection system of claim 22, in which stop means is provided at one end of said second chamber for limiting movement of said piston in said rod extending direction, said one end of said rod is mounted in said piston so as to be movable axially relative thereto, and coacting means is carried by said rod and said vent valve member for effecting movement of said vent valve member to said second position in response to axial movement of said rod relative to said piston and after said piston has engaged said stop means.

24. The restraint and protection system of claim 23, in which said vent valve member has a tubular portion of lesser diameter than the internal diameter of said third chamber and a disk portion of substantially the same diameter as said third chamber, said tubular portion is slidably mounted on said rod and said disk portion slidably engages the inner surface of said third chamber, said disk portion divides said third chamber into two parts, and at least one pressure equalization port is provided in said disk portion and establishing communication between said parts of said third chamber.

25. The restraint and protection system of claim 24, in which said coacting means comprises a shoulder on said rod and an extension of said tubular portion of said vent valve member.

26. The restraint and protection system of claim 24, in which said coacting means comprises a groove in said rod and at least one detent carried by the tubular portion of said vent valve member and extendable into said groove.

27. The restraint and protection system of claim 22, in which said second source of fluid under pressure comprises a tank mounted in said vehicle and filled with fluid under pressure, and said vent port is sized to permit fluid to escape from said tank and said cushioning means at a controlled rate after said cushioning means is fully inflated.

28. The restraint and protection system of claim 21, in which third conduit means connects said second chamber with said control valve means, and quick-release valve means is provided in said third conduit means between said second chamber and said control valve means, said quick-release valve means being responsive to the pressure in said third conduit means and movable to a position connecting said third conduit means with the atmosphere when the pressure in said third conduit means falls below a predetermined value.

29. The restraint and protection system of claim 22, in which said vent valve member is shiftable to its second position due to extension of said rod to a vent position beyond the position thereof corresponding to the operative positions of said movable members, extension of said rod to said vent position being effected by movement of said movable members to positions beyond their operative positions as a result of the force exerted on said cushioning means by the bodies of the driver and occupants during a collision.

30. The restraint and protection system of claim 1, in which said actuating means includes means for effecting expansion of said cushioning means after said arms have moved to their operative positions.

* * * * *